United States Patent
Steel et al.

(10) Patent No.: US 9,510,027 B2
(45) Date of Patent: Nov. 29, 2016

(54) MEDIA CONTENT PROCESSING/DISTRIBUTION SYSTEM

(75) Inventors: Christopher Steel, Southampton (GB); Michael Neill, Southampton (GB); Martin Adams, Southampton (GB); Neal Forse, Southampton (GB)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/389,909

(22) PCT Filed: Apr. 2, 2012

(86) PCT No.: PCT/EP2012/055985
§ 371 (c)(1),
(2), (4) Date: Oct. 1, 2014

(87) PCT Pub. No.: WO2013/149647
PCT Pub. Date: Oct. 10, 2013

(65) Prior Publication Data
US 2015/0074734 A1 Mar. 12, 2015

(51) Int. Cl.
*H04N 7/173* (2011.01)
*H04N 21/2343* (2011.01)
*H04L 29/06* (2006.01)
*G06F 9/50* (2006.01)
*H04N 21/2368* (2011.01)
*H04L 29/08* (2006.01)

(52) U.S. Cl.
CPC ........ *H04N 21/2343* (2013.01); *G06F 9/5072* (2013.01); *H04L 65/1053* (2013.01); *H04L 65/602* (2013.01); *H04N 21/2368* (2013.01); *H04N 21/234372* (2013.01); *H04L 67/16* (2013.01)

(58) Field of Classification Search
None
See application file for complete search history.

(56) References Cited

U.S. PATENT DOCUMENTS

2002/0156641 A1* 10/2002 Kitajima ................ G06Q 10/02 705/1.1

OTHER PUBLICATIONS

Makaya, C., et al., "Services Composition Based on Next-Generation Service Overlay Networks Architecture", New Technologies, Mobility and Security (NTMS), 2011 4th IFIP International Conference on, IEEE, Feb. 7, 2011, pp. 1-6, XP031982232.
Komorita, S., et al., "Loosely Coupled Service Composition for Deployment of Next Generation Service Overlay Networks", IEEE Communications Magazine, IEEE Service Center, Piscataway, US, vol. 50, No. 1, Jan. 1, 2012, pp. 62-72, XP011396936.
Herborn, S., et al., "A Distributed Scheme for Autonomous Service Composition", Proceedings of the First ACM International Workshop on Multimedia Service Composition (MSC05), Nov. 11, 2005, pp. 21-30, XP007917653.

* cited by examiner

*Primary Examiner* — Hunter B Lonsberry
(74) *Attorney, Agent, or Firm* — Patents on Demand P.A.; Brian K. Buchheit; Scott M. Garrett

(57) ABSTRACT

A media content distribution system (10) comprises a plurality of interconnected system resources (13-15) arranged to receive and/or transmit media content. A number of the system resources (13-15) have a capability of performing a transform processing operation on the media content. A system controller (20) automatically determines connectivity of the system resources (13-15) and determines the transform capabilities of the system resources using control messages received from the system resources. A first of the system resources can advertise information about a potential combined system resource which is possible if at least one transform capability of the first system resource is combined with at least one transform capability of another system resource. The system controller (20) can output a map of the system resources on the user interface (25). The user interface (25) can allow a user to explore detail of resources (13-15) and select routes between nodes.

31 Claims, 25 Drawing Sheets

MEDIA CONTENT PROCESSING/DISTRIBUTION SYSTEM

CROSS-REFERENCE TO RELATED APPLICATION

This application is a 35 U.S.C. §371 National Phase Entry Application from PCT/EP2012/055985, filed Apr. 2, 2012, and designating the United States.

TECHNICAL FIELD

This invention relates to a media content processing/distribution system, such as a processing/distribution system for video and audio content.

BACKGROUND

The introduction of digital methods of broadcasting has revolutionised media management in production and transmission environments. The explosion in the volume of content that is now available to publishers and the corresponding capacity available from digital transmission systems to deliver it to consumers has presented challenges to media management. The alliance of these developments and the availability of affordable national, regional and fully global network resources has opened the prospect that media systems need not be limited by local or regional scope. Whether a media publisher is limited to local or fully global cover the systems needed to support their operations should scale such that each operator can use the same technical infrastructure defined by the same concepts and standards.

A distribution system for video and audio content comprises a plurality of nodes between a source of video content (e.g. a studio, satellite receiver, server) and a sink of video content (e.g. a satellite uplink, an end user). In the delivery path between the source and the sink the video content will typically be subject to processing operations (transforms). The processing operations may alter various parameters of the video content, such as coding rate, coding type, picture aspect ratio, frame rate, audio rate, audio format. Processing operations may be required to match local requirements, such as a video format used in the country where the sink is located. Processing operations may be required to convert media content into a form which is compatible with requirements of different end user devices (e.g. portable devices will typically require a lower bitrate stream compared to a set-top box).

A general purpose communication network (e.g. an IP-based network) is typically only concerned with delivering traffic between two (or more) endpoints, with packet switching at intermediate nodes. In contrast, a media content processing/distribution system comprises equipment which performs specialist processing operations to the media content carried within IP packets (e.g. coding, decoding, transcoding, transrating). A user may require a particular sub-set of these processing operations for a delivery stream, and typically there is a particular order in which these processing operations must be performed. Accordingly, the challenges facing a media distribution system are different to those facing a general-purpose communication network.

Currently, the control and configuration of large media content processing/distribution systems (which may comprise hundreds of geographically dispersed physical devices) is performed controlled through a dedicated GUI per device, or a dedicated GUI per sub-system (e.g. small set of devices).

Currently, video distribution systems are configured manually. A product called nCompass Control supplied by Ericsson™ provides a graphical user interface (GUI) by which a user can create a map of the system. A user can manually insert an icon on the map to represent each device in the system and can manually configure links between the icons representing devices. The process requires manual inspection of equipment racks to gather information to populate the map. The current process of controlling the network is time-consuming. As systems become increasingly large and more complex it is becoming increasingly more difficult for a user to control the system, and to perform operations such as setting up a delivery path for a media content flow. When a user of the control system wants to create a new path between a content source and a content sink, they must select a path across the network and then individually manipulate an interface for each device along that path.

The present invention seeks to provide an improved way of controlling a media content distribution system.

SUMMARY

A first aspect of the invention provides a method of operating a controller of a media content distribution system. The system comprises a plurality of interconnected system resources arranged to receive and/or transmit media content. A number of the system resources have a capability of performing a transform processing operation on the media content. The method comprises automatically determining connectivity of the system resources and determining the transform capabilities of the system resources using control messages received from the system resources. This avoids the need to manually acquire information about resources in the system, and how the resources are connected, which can involve manual investigation and is prone to error.

The media content distribution system is a system where devices in the system not only forward data streams, but have the capability of performing a transform processing operation on the media content, such as decoding media content, encoding media content or manipulating the data representing the media content in some way.

Advantageously, the step of determining the transform capabilities of the system resources comprises receiving information from a first of the system resources about a potential combined system resource which is possible if at least one transform capability of the first system resource is combined with at least one transform capability of another system resource. The information received from the first of the system resources can specify the at least one transform capability of another system resource which is required to perform the potential combined system resource. This has an advantage of allowing the system to perform additional transform processing operations which are beyond the capabilities of individual resources. For example, a transcoding operation can be performed by combining a decoding capability of one resource and an encoding capability of another resource.

Each of the system resources can comprise processing resources which have a processing capacity, and each of the transform processing operations requires an amount of the processing resources to implement, called a cost. Advantageously, the method further comprises determining processing capacity of the system resources and cost of the transform processing operations using control messages received from the system resources.

Advantageously, the method further comprises receiving an input representing a first node of the system. The method further comprises receiving an input representing a first media content present at the first node which it is desired to route. The method further comprises determining properties of the first media content at the first node. The method further comprises receiving an input representing a second node of the system. The method further comprises determining properties required for the media content at the second node of the system. The method further comprises computing a route for the first media content between the first node and the second node using system resources which will transform the first media content from the properties of the first media content at the first node of the system to the properties required for the first media content at the second node. The computing of the route uses the determined transform capabilities of the system resources and the determined connectivity of the system resources.

Advantageously, the method further comprises generating a logical map of the system resources, based on the determined connectivity of the network resources and the determined capabilities of the network resources. The method further comprises outputting the logical map as a display on a user interface, wherein the map comprises icons representing the system resources. This has an advantage of providing a user with an overall view of the system, and of the resources of the system, such as the transform functions which can be performed at different parts of the system. This considerably simplifies the effort required to create a new path between nodes for distributing media content, or modifying an existing path between nodes for distributing media content.

Advantageously, the connectivity and capability information is in a hierarchical form, and the method further comprises receiving a user input via the user interface to explore a selected resource or portion of the logical map and, in response, outputting an increased amount of detail about the selected resource or portion of the map from a lower hierarchical level of the connectivity and capability information.

Advantageously, the method further comprises receiving an input via the user interface of a selected node on the map; and outputting, via the user interface, information about media content present at that node. Advantageously the information about media content is presented as a hierarchy of data flows.

Advantageously, the method further comprises receiving an input via the user interface of a first waypoint node on the map and outputting, via the user interface, information about a first set of media content present at that first waypoint node. The method further comprises receiving an input via the user interface of a second waypoint node on the map and outputting, via the user interface, information about a second set of media content present at that second waypoint node. The method further comprises determining properties required for the selected media content at the second waypoint node. The method further comprises receiving an input via the user interface to transfer a selected media content stream from the first set to the second set. The method further comprises computing a route for the selected media content stream between the first waypoint node and the second waypoint node via network resources which transform the selected media content stream to the properties required at the second waypoint node.

Another aspect of the invention provides a method of operating a system resource of a media content distribution system. The system resource is capable of interconnecting with other system resources. The system resource is capable of performing a transform processing operation on the media content. The method comprises sending information about connectivity of the system resource to other system resources. The method further comprises sending information about transform capabilities of the system resource as a control message to a system controller.

Advantageously, the step of sending information from the system resource comprises sending information about a potential combined system resource which is possible if at least one transform capability of the system resource is combined with at least one transform capability of another system resource. The information sent from the system resource can specify the at least one transform capability of another system resource which is required to perform the potential combined system resource.

Advantageously, the method further comprises storing logic which defines how to at least one of: form a connection between the at least one capability of another system resource to form the combined system resource; and configure the at least one capability of another system resource to form the combined system resource. The method further comprises using the logic to form the combined system resource.

Advantageously, the system resource comprises a processing resource which has a processing capacity, and each of the transform processing operations requires an amount of the processing resources to implement, called a cost. The method further comprises sending information about the processing capacity of the system resource and the cost of the transform processing operations using a control message.

Another aspect of the invention provides a system controller for a media content distribution system, the system comprising a plurality of interconnected system resources arranged to receive and/or transmit media content, a number of the system resources having a capability of performing a transform processing operation on the media content, wherein the system controller is arranged to automatically determine the connectivity and the transform capabilities of the system resources using control messages received from the system resources.

Another aspect of the invention provides a system resource for a media content distribution system, wherein the system resource is capable of interconnecting with other system resources, and the system resource is capable of performing a transform processing operation on the media content, the system resource being arranged to send information about connectivity of the network resource to other network resources and send information about transform capabilities of the network resource.

Another aspect of the invention provides a media content distribution system, comprising a plurality of interconnected system resources arranged to receive and/or transmit media content, a number of the network resources arranged to perform a transform processing operation on the media content. The system further comprises a system controller arranged to automatically determine the connectivity and the transform capabilities of the system resources using control messages received from the system resources.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
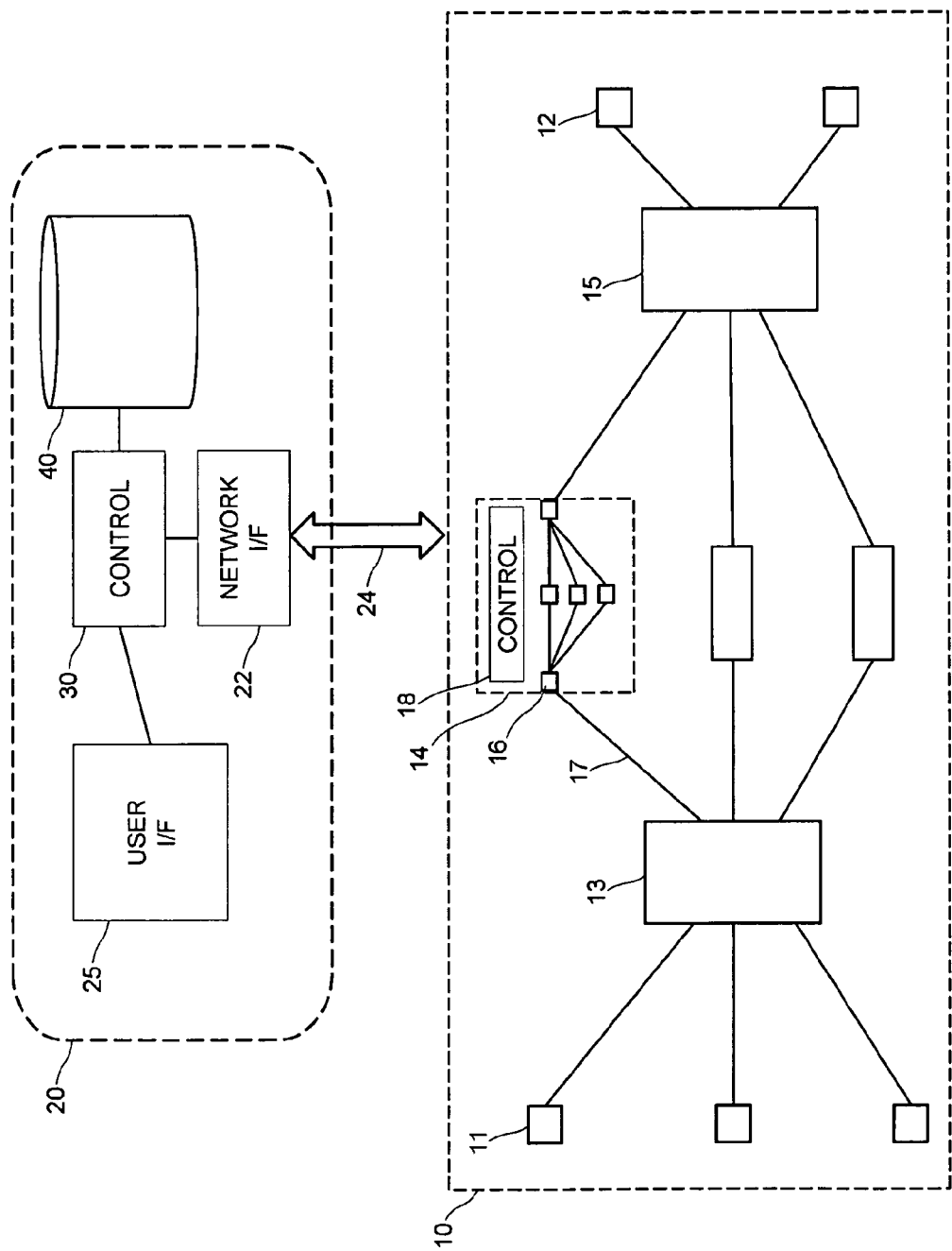
FIG. 1 shows a media content processing/distribution system and a control system.

FIG. 1 shows an example of a system 10 which can be used to process and distribute media content. The media content can comprise a range of different content types, such as one or more of: video, audio, data. The system 10 comprises a plurality of inputs, or sources, 11. A source can be any source of media content, such as a studio, server, satellite or cable receiver. The system 10 comprises a plurality of outputs, or sinks, 12. A sink can be any device which consumes or stores media content. Examples include a device of an end user (e.g. portable device, set-top box, display device), a commercial customer (e.g. a distribution company), satellite uplink transmitter, cable feed, server, etc. The system 10 also comprises devices 13-15. One or more of devices 13-15 can perform a transform processing function on media content. For the example of video content, processing functions can comprise: coding, decoding, transcoding, transrating, and can comprise functions which change parameters such as: coding rate, coding type, picture aspect ratio, frame rate. These are processing functions which alter the digital data representing the video content. One or more of devices 13-15 can perform functions which combine or separate flows of media content such as: multiplexing, filtering of content flows (e.g. filtering based on Packet Identifier, PID), de-multiplexing. One or more of devices 13-15 can comprise a switch for switching data flows which carry media content.

Any device 13-15 within the system 10 may itself comprise a further plurality of devices. This is illustrated by device 14, which comprises devices 16 and a controller 18. In turn, any of devices 15 may comprise a further plurality of devices (and a controller), and so on. The system 10 can therefore be seen as a system of systems. Each sub-system of the overall system 10 can comprise a controller.

A control system 20 is provided for controlling operation of the overall system 10. The control system 20 comprises: a controller 30; a network interface 22 for communicating 24 with devices within the system 10; storage 40 for storing data used by the control system 20; and a user interface 25 for allowing a user to interact with the control system. Controllers may also be provided at lower levels of the network, such as per sub-system or per device.

The system comprises physical resources. Typically, a physical resource is a processing engine which exists at a specific place (e.g. at one of the devices 13-15) in the system. Physical resources can host (multiple) virtual resources which are individual use cases of the physical resource. A virtual resource has capabilities which describe the attributes of that virtual resource. A physical resource has capabilities which describe which virtual resources it can support and the constraints on what combinations of virtual resources can be supported at the same time.

Resource Capability Reporting/Resource Inventory Qualification Mapping

Figure 2:
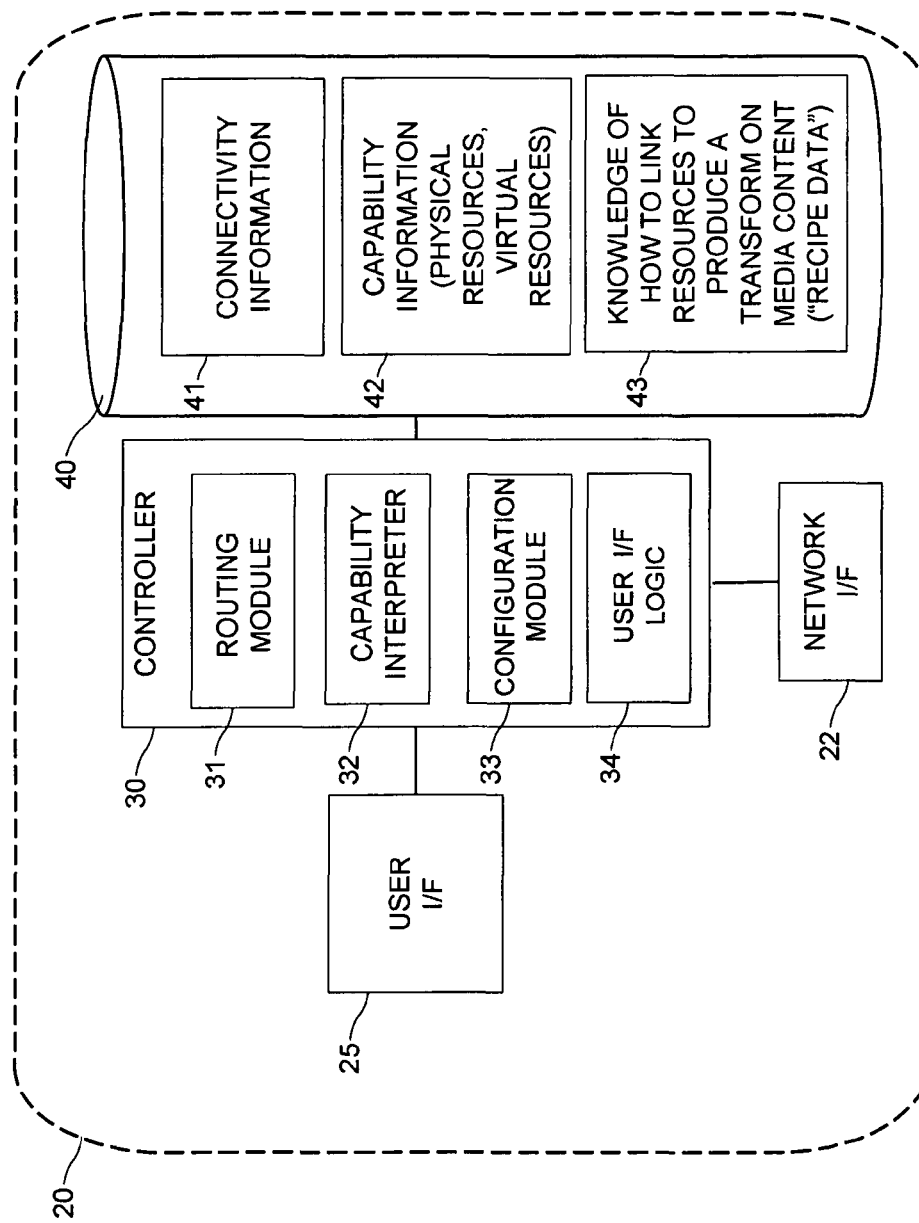
FIG. 2 shows a control system for the overall system shown in FIG. 1.

The control system 20 of the system 10 is shown in more detail in FIG. 2. The control system 20 acquires information 41 about connectivity of devices 13-15 in the system 10, i.e. how devices 13-15 are connected to one another. Control system 20 also acquires information 42 about capabilities of devices 13-15 in the system 10, i.e. what functions each of devices 13-15 are capable of performing. The connectivity information 41 and capability information 42 is stored in storage 40. Configuration module 33 sends control messages to configure resources in the system, once a route for a media content stream has been determined. The capability interpreter 32 converts the capabilities supplied by each resource into internal data structures within the control system 30 which can be used more efficiently by the routing module 31 and the configuration module 33.

A capability can be a processing function which the device can perform on media content, such as audio decode, audio encode, video decode, video encode, data delay. A capability can be a processing function which combines or separates flows of media content such as transport stream demux, transport stream mux. A capability can be a processing function which operates on transport streams, such as adding IP encapsulation, or removing IP encapsulation.

The capabilities of a resource describe what format(s) of data can be accepted by the resource, and what format(s) of data can be produced by the resource. Capabilities can also define how the resource can be configured and what status messages can be generated by the resource. Each parameter in the resource configuration can be specified in terms of name, description, type, size, and any constraints that apply to that parameter.

Figure 3:
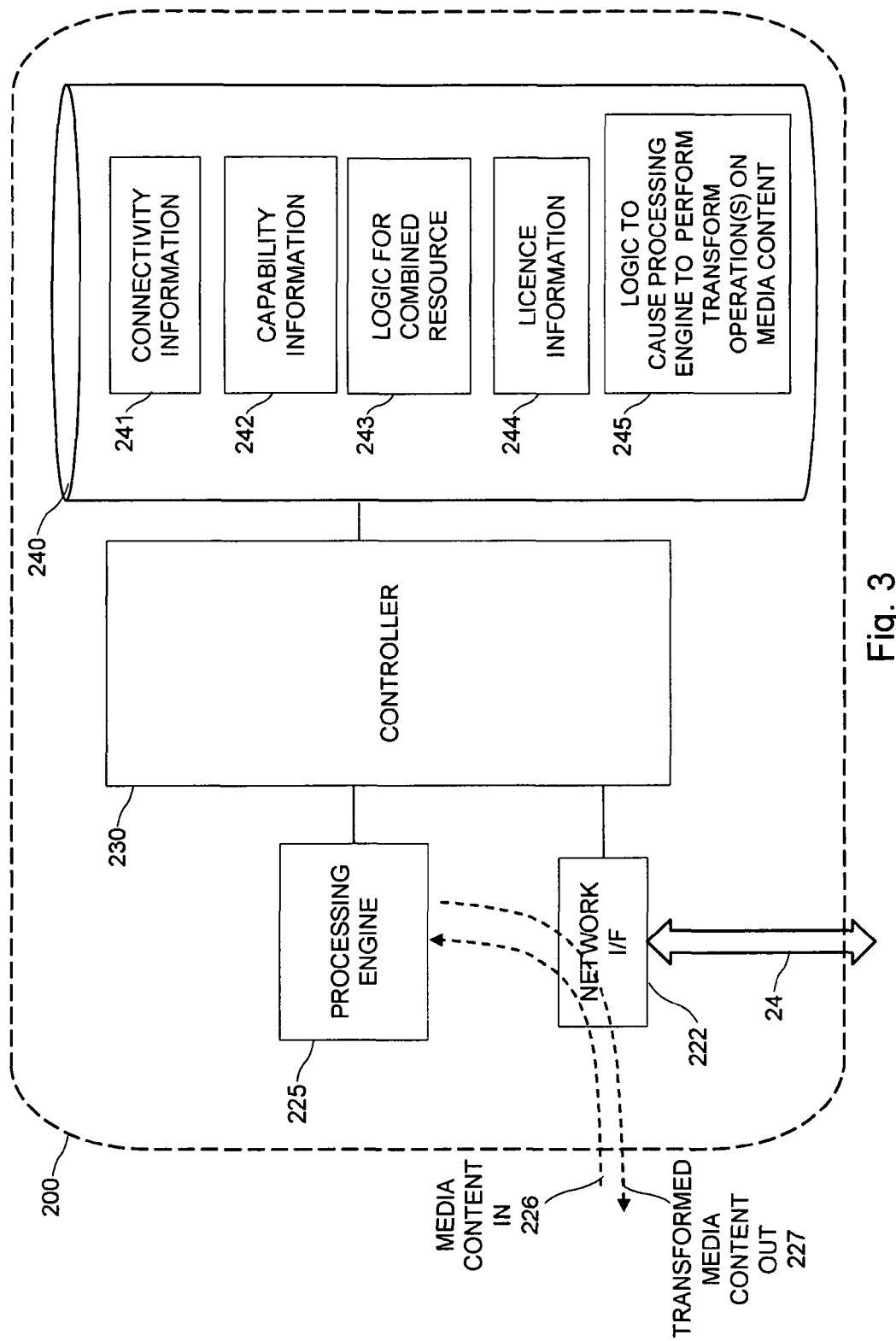
FIG. 3 shows a device for use in the system of FIG. 1.

FIG. 3 shows a device 200 for use in the media content processing/distribution network (e.g. one of the devices 13-15). The device 200 comprises a controller 230, storage 240, a network interface 222 and one or more processing resources, shown here as engines 225. The device 200 can comprise a processing engine 225 which is capable of more than one processing task. Logic 245 (e.g. software stored in storage 240 at the device) determines what processing functions can be performed by the processing engine. The processing functions may vary over time. For example, licence information 244 may only permit the device 200 to perform a particular function (e.g. a type of coding) for a limited time period. Media content is received 226 by the device, transformed by the processing engine 225, and output 227 towards another device in the system.

Advantageously, a processing engine 225 can support multiple use cases running simultaneously, so there are physical resources which represent physical instances of hardware processing engines (for example an audio DSP) and virtual resources which represent individual use cases of the physical resource (for example an audio decode or audio encode). There can be multiple virtual resources hosted on a single physical resource.

As described above, each physical resource can host multiple virtual resources. The number of virtual resources which can be hosted at the same time is defined using a wealth/cost model where the physical resource has a fixed wealth, and each virtual resource has a fixed cost. As each new virtual resource is allocated to a physical resource, the wealth of the physical resource is reduced by the cost of the virtual resource. If the cost of a new virtual resource is greater than the remaining wealth of a virtual resource, then the physical resource cannot host the virtual resource. The number and location of the physical resources within a device are specified in the capabilities exported from that device. The capabilities exported from each node in the system defines the list of virtual resources and their cost (in terms of physical resources required to implement that virtual resource), the capacity of the physical resources (i.e. their wealth) and where the physical resources are located within the node (i.e. their location). The physical resources can be a firmware block, a CPU, or a complete box. The node could be a box, a card or a system. The wealth/cost model mentioned above is held within the data store of the control system that is responsible for routing media content between the resources.

Figure 4A:
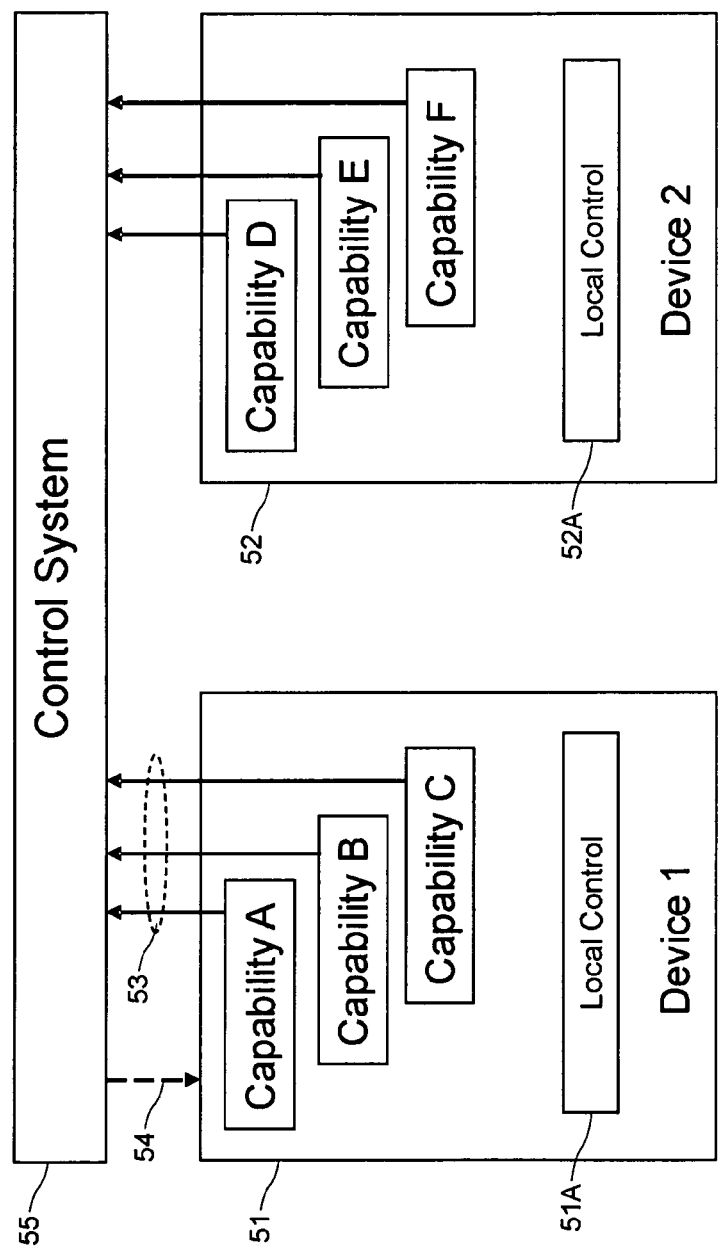
FIG. 4A shows transfer of capability information from devices to a control system.
Figure 4B:
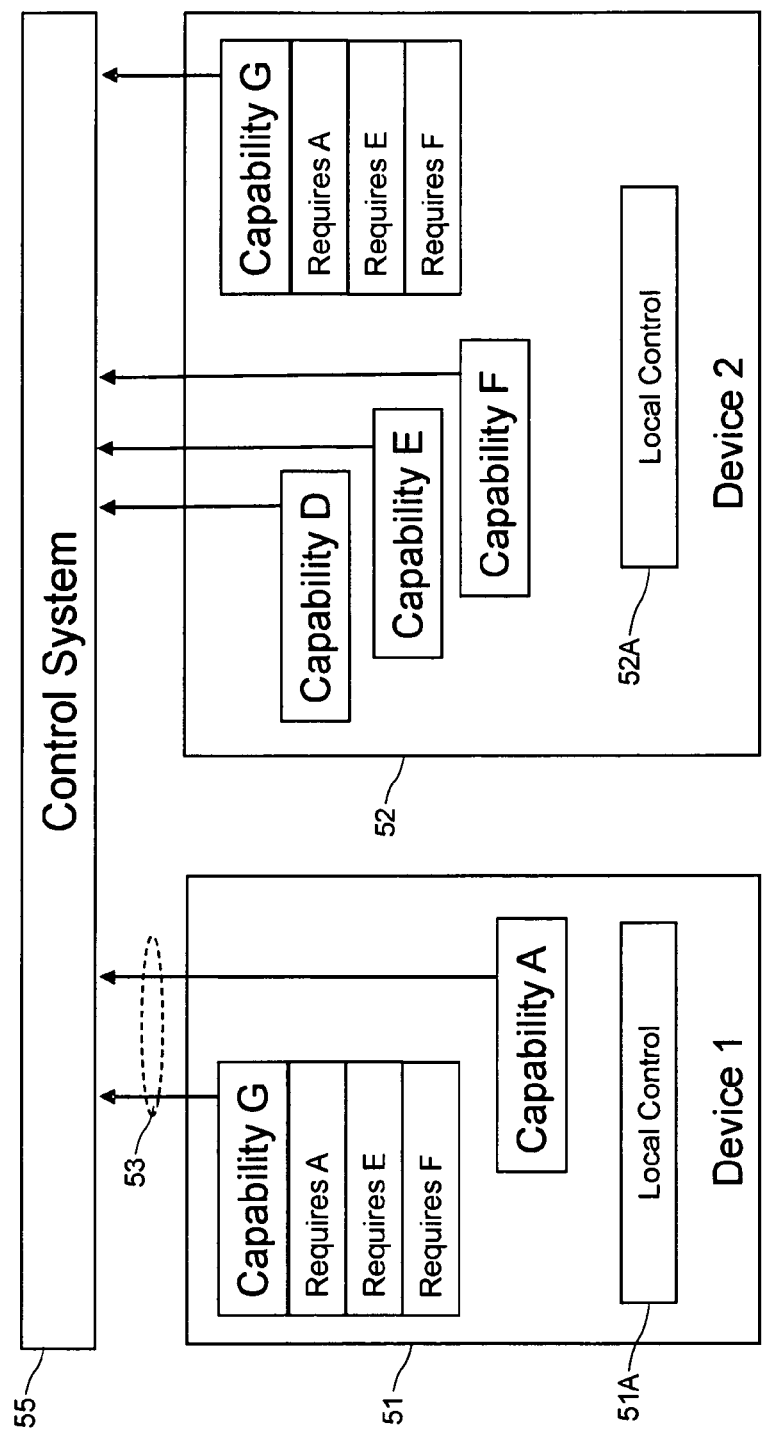
FIG. 4B shows transfer of capability information about a potential combined resource from devices to a control system.

Capability reporting will now be described with reference to FIGS. 4A and 4B. FIG. 4A shows an example of two devices: Device 1, 51, and Device 2, 52 and a control system 55. The control system can represent control system 20 shown in FIG. 1, or a controller at a lower level of the network. Each device 51, 52 provides information about the capabilities of the device. Device 1, 51, indicates that it supports: capability A, capability B, and capability C. Device 2, 52, indicates that it supports: capability D, capability E, and capability F. Capability information 53 can be advertised by a device in an unsolicited manner. For example, a device may advertise capability information when it is first connected to the system 20. A device may send advertisements periodically. A device may send advertisements whenever capabilities are changed. Alternatively, a device 51, 52 can be polled 54 for the capability information. However, polling is less advantageous in large systems where there is a large number of devices to track.

In FIG. 4A, each device 51, 52 only provides information about the capabilities of that individual device. In FIG. 4B, a device can also provide information 53 about a capability which arises from combining component capabilities of multiple devices. Capability G requires a combination of capability A (hosted by device 1, 51) plus capability E and capability F (hosted by device 2, 52). Capability G is an example of a "combined resource". It is hosted by the device which exports the capability. In this example, each of device 1 and device 2 advertise the capability G. Another option is that the combined resource is advertised only by the device hosting the greatest number of the component resources required for the combined resource (e.g. device 2, 52). An example of a combined resource is a transcoding function. Device 1 may host a decoding function and device 2 may host a coding function. When these separate functions are combined, they become a transcoding function. Another example is that several transcoders could be combined into an adaptive streaming profile so that the combined resource would accept a Single Program Transport Stream (SPTS) as an input, and generate a Multiple Program Transport Stream (MPTS) containing several copies of the input stream transcoded to different bit rates. The same principle could be applied to audio encoders where a single combined resource could accept an audio stream and produce several different output streams with different encode attributes (stereo, 5.1, 7.1 . . . ). At a higher level, a combined resource accept an MPTS, and produce several MPTS containing the same content as the input MPTS, but each transcoded using a different set of encoding parameters.

The combined resource comprises knowledge of how to route and configure the component resources. In this simple example of a transcoding function, the combined resource knows where the component resources are located and knows that an input signal must be routed to an input of the decoding function and that an output of the decoding function must be connected to an input of the encoding function. In effect, the knowledge of how to route and configure the component resources is proxied through the control system but under the control of the combined resource. This allows resources to be geographically distant, and the only constraint is that they must all be visible to the control system. However, when the control system knows that the resources are visible to each other (as it is desirable that all the resources are as closely co-located as possible) then the same interface can be provided by the local control system to allow more efficient communication over a shorter distance. Since the system contains a hierarchy of control systems (each physical unit contains a control system which implements the routing between the resources within that unit) the combiner resource communications would be proxied through the lowest level control system available.

The combined resource can also comprise logic to alter routing and configuration based on status messages from the component resources. An example of this is a combined resource which accepts two Single Program Transport Streams (SPTS) as inputs. Both of these SPTS have the same content but are supplied by different sources. The combined resource monitors the bitrate of each stream so that it can see if a source has failed. Only one of the two inputs is connected to the single output at any time, but if the source which supplies the input which is currently routed to the output suffers a failure then the combined resource can break the connection between the failed input source and the output, and create a new connection between the secondary input source and the output.

Advantageously, the configuration of a combined resource should contain a method of configuring each component resource. Advantageously, the configuration of a combined resource should contain a method of causing connections to be formed between component resources. Both of these methods are proxied back through the nearest available control system. In the example of a transcoder created using the arrangement of resources shown in FIG. 4B, assume combined resource G is created on device 1, 51. The configuration of decoder resource A by transcoder combined resource G on device 1 will be proxied through the local control 51A on device 1. The local control 51A has some resource specific code for each physical resource on device 1 so this configuration can take the form of a callback function for resource A being provided to resource G. Routing requests are all sent to the control system 55 shown in FIG. 4B which allocates a route between device 1, 51, and device 2, 52. Configuration of encoder resources E and F on device 2 can be proxied through the control system 55, which will relay the configuration to the local control 52A on device 2 and then onto resources E and F.

Figure 5:
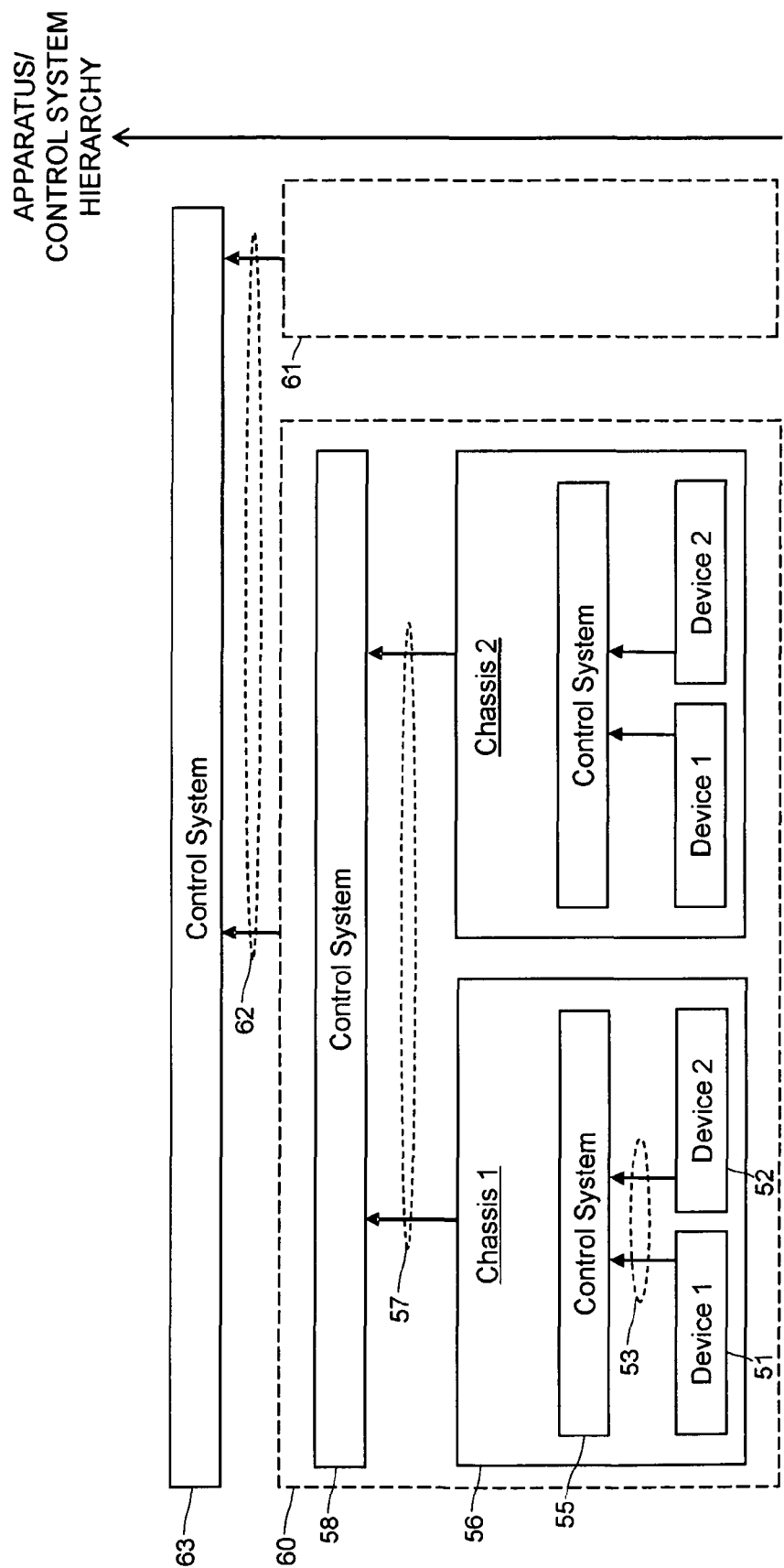
FIG. 5 shows a hierarchy of apparatus and control systems.

Each level of control system can export capabilities to a higher level control system. FIG. 5 shows a hierarchical arrangement of equipment and control systems. Starting with the lowest level of the hierarchy, Device 1, 51, and Device 2, 52, provide information 53 about their capabilities to the control system 55, as explained previously with respect to FIG. 3. The arrangement of devices 51, 52 and control system 55 can comprise a chassis 56 in an equipment rack, for example. This first chassis will be called Chassis 1. Similarly, there can be another chassis, Chassis 2, which also comprises devices and a control system. Each chassis provides information 57 about capabilities of the respective chassis to a higher level control system 58. The arrangement of chassis 56 and control system 58 can comprise a subsystem 60 within a larger system. Information about capabilities of this sub-system is provided to a higher level control system 63.

Advantageously, capabilities are combined into combined resources at each level of hierarchy. For example, in the example of FIG. 5, chassis 1 could advertise some combined capability that arises from combining capabilities of chassis 1 and chassis 2. The same method of combined capabilities works at the level of combining resources between two option cards within a single chassis, and also works at the level of combining resources between two racks of the chassis. Each chassis can export XML describing the capabilities of device 1 and device 2 upwards to control system 58. Control system 58 aggregates the capabilities of device 1 and device 2 before exporting them to control system 63. If chassis 1 and chassis 2 both contain identical device 1 and device 2, the capabilities exported by control system 55 of each chassis will be identical, so the aggregated capabilities exported by control system 58 will be identical to the capabilities exported by control system 55.

This has an advantage of reducing the overall amount of capability information propagated in the system (for example, compared to a situation where each low-level device 51, 52, advertises information across the high-level system), and also helps to increase the usefulness of the information that is propagated, because it defines a hierarchical relationship between resources.

A device in a system has physical resources such as a processing engine which is capable of one or more functions. These possible functions are capabilities, or virtual resources. When a device commits to performing a particular function, the amount of virtual resources decreases.

Referring again to FIG. 3, the connectivity information 241 may be acquired by: one system resource advertising an identity of the system resource to other system resources; receiving identities of other system resources connected to the system resource. The connectivity information 241 comprises the identities of other system resources that were received. Storage 240 stores capability information 242. Capability information has been described above with reference to FIGS. 4A, 4B and 5. It is information about the capabilities of the resource, such as the types of transform processing operations that it can perform on media content. If the resource 200 hosts a potential combined resource, the capability information 242 identifies capabilities that are required from other component resources to realise the combined resource. Logic 243 defines: (i) how to connect component resources to realise the combined resource; and (ii) how to configure component resources to realise the combined resource. Network interface 222 connects the resource 200 to other resources. It also connects the resource 200 to the control system 20.

An advantageous implementation uses the Network Configuration Protocol (NETCONF), published as RFC 4741 and RFC6241. The capability information described above can be encoded using Extensible Markup Language (XML).

Control System and User Interface

Referring again to FIG. 1, the control system of FIG. 1 receives information about connectivity of devices within the system 10 and information about capabilities of devices within the system 10. This information can be automatically obtained in the manner described above.

An aspect of this invention provides a control system 20 with a user interface 25 which is arranged to output the information about connectivity and information about capabilities of devices within the system 10 as a map of system resources.

When a device is connected to the system 10, the control system 20 detects the device and receives information about the capabilities. The control system/user interface then enables menus pertaining to the advertised device capabilities. The system map is generated automatically, and a user is not required to manually create the map. The control system interprets all possible virtual resource associations advertised by capabilities of each device.

The control system 20 is able to identify and allocate devices and processes required to support a given service where the resources needed can be selected from an inventory. Such an inventory can comprise all devices available to the global network and would include detailed information about each device and its capabilities.

The control system 20 provides a way of visualising resources and their allocation to services which can also be used to set up and break down service instances by an operator. This system would include means to advise the operator about options for matching requirements to resources and also to advise on the most efficient routes and methods of interconnections. Advantageously, the control system 20 can:

Identify available system resources and their competences by polling or self-advertising means;

Correctly combine system elements to create a broadcast infrastructure and working service delivery system properly matched to the capabilities of each of its component elements;

Configure automatically a system to set up, deliver and maintain these particular sets of services using inherent knowledge of the correct recipe of resources needed to implement a specific service case;

Maintain services in progress including monitoring performance and continuity reporting and taking planned remedial action in case of failure.

The control system comprises a list of "recipes" (e.g. determined at design time) of how to achieve each use case of the system. At run time, the control system determines which recipe for a particular use case can be constructed using the available resources. The list of recipes for each use case may be short (e.g. a single choice) as a system use case would comprise a series of component use cases, and a component use case is modelled as a virtual resource.

The control system has built-in knowledge (43, FIG. 2) of how to link together a known set of resources in order to produce a desired transformation of the data in a stream. The control system can use knowledge of the 'preferred' recipes, and the available ingredients/resources in order to select the combination of ingredients/resources that will generate the desired result. For example, it is possible to transform a video stream from one format, at a given resolution, to another format at a different resolution in several different ways:

1. The resolution could be changed to the required output resolution, and then the format could be modified.
2. The video could be converted to the required format and then the resolution modified.
3. The video could be converted to a generic format, the resolution could then be changed and then it could be output in the required format.
4. The video could be fed into a single component that performs both functions in a manner hidden from the outside world (black box).

All of these methods would be known to the control system and they could be ranked in the order that produces the 'best' output. The control system would then use knowledge of the available resources to select the method/recipe that produces the 'best' output possible. The term "best" can refer to quality, bit rate, resource usage, or a combination of these or other parameters, and could be a steering parameter into the control system.

The same virtual resource can be hosted by any physical resource which can support that use case so there should not be many different combinations of virtual resources needed to achieve a single result. As virtual resources can be aggregated into combined resources at one or more levels of the system hierarchy, there may be instances of a primary recipe which is composed of combined resources and thus spreads the load of configuration and control across several lower level control systems, or a secondary recipe which is composed of individual virtual resources which must be controlled from the higher level control system.

Advantageously, the user interface is a Graphical User Interface (GUI) which can be used for all of these aspects of service assembly and system maintenance, such as redundancy protection and response to fault conditions. The user interface 25 can comprise a display screen for visually outputting information to a user combined with a mouse, trackball or other user input device for allowing a user to move a cursor and select a display element (icon) on the display screen. Alternatively, the user interface 25 can comprise a touch screen display, where a user can touch a display element on the display to make a selection. The user interface can comprise a keyboard, or a virtual keyboard displayed on the touch screen display, for allowing a user to enter information.

Logic (34, FIG. 2) controls operation of the user interface. Logic 34 controls what information is presented to a user on the user interface 25 and how the user interface responds to interactions made by a user.

Figure 6:
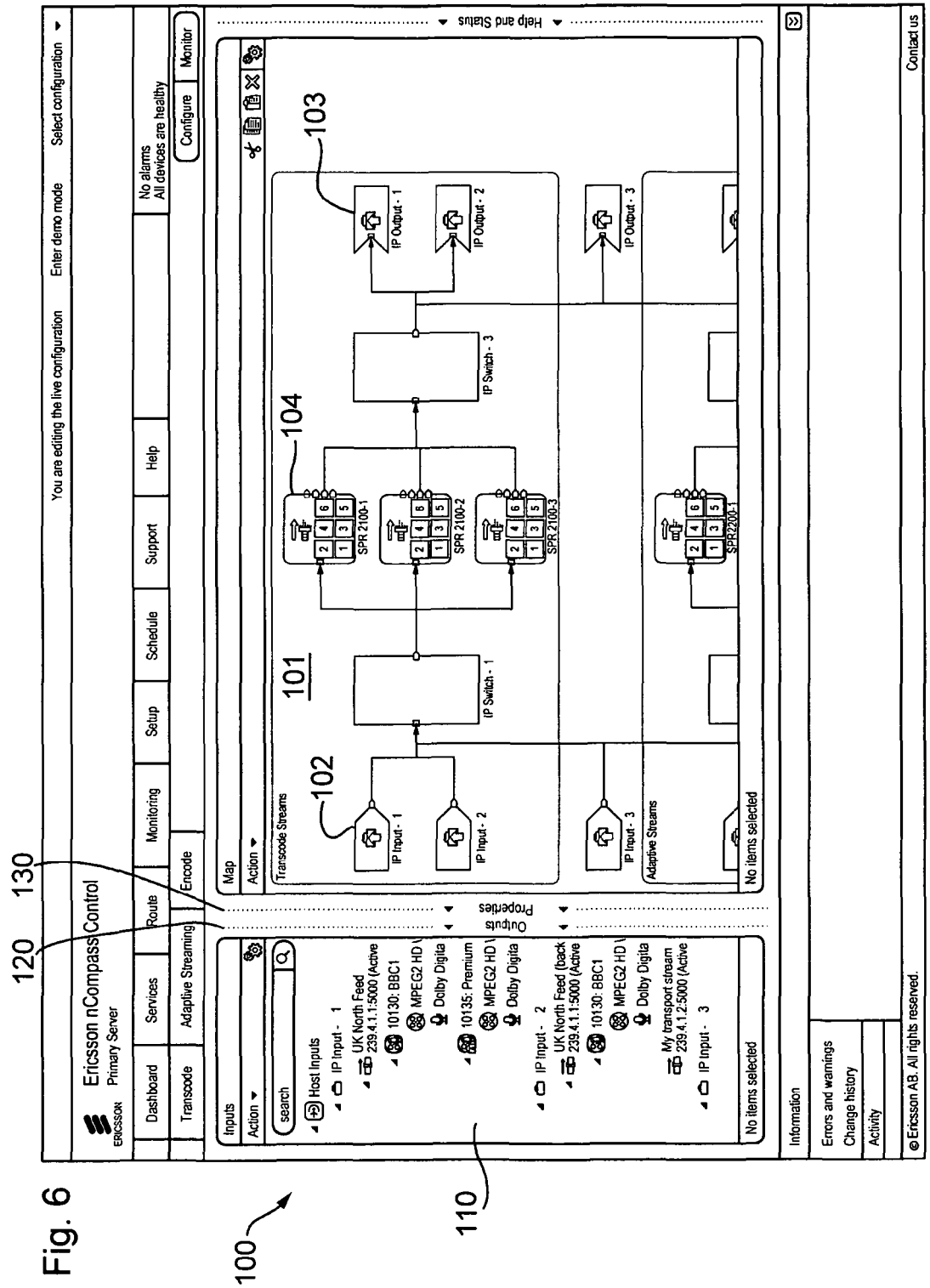
FIG. 6 shows an example screenshot of a display of a user interface for controlling a media content distribution system.

FIG. 6 shows an example screenshot 100 of the user interface 25. A map pane 101 displays a map of resources of the system. The map can display all, or a part of, the overall system. When a device/resource is discovered, it is added to the map. A user may wish to re-arrange the placement of the device/resource on the map once it has been discovered.

Advantageously, a user can zoom into part of the map to reveal further detail about a part of the system. The zoom-in operation can reveal information from lower hierarchical levels of the system. For example, referring back to the example hierarchy of FIG. 5, the map may initially display resource 60 as a single box. Upon receiving an instruction to zoom into resource 60, the user interface may then reveal information from the chassis level 56 within resource 60. Upon receiving an instruction to zoom further into the chassis 56, the user interface may then reveal information about devices 51, 52. A user interface of this kind has an advantage in that a user is not overwhelmed by a large amount of unnecessary information, while the user interface can still provide more detailed information as it is required, such as when a user wants to focus on a particular component, device, groups of devices or any combination thereof.

The control system and user interface provide an operator with an overarching control GUI that allows the operator to control the complete system whilst still allowing them to have the facility to focus on any component, device, groups of devices or any combination thereof. The user interface is built around the concept of defining a system as:

Input item→Transfer function→Output item

Input tree→Configuration Settings→Output tree

Returning to the screenshot of FIG. 6, a pane 110 displays data flows which form inputs 102 to the part of the network currently displayed in the map pane 101. Another pane 120 (shown collapsed in FIG. 6) displays data flows which form outputs 103 from the part of the network currently displayed in the map pane 101. The map pane 101 can display system resources in terms of functional units, i.e. the functions that devices perform. This is the "information about capabilities" and "virtual resources" described above and provides an operator with a more useful representation of the network which abstracts away from hardware based resources. However, the map pane 101 can also be switched to a view where it shows physical resources. Another pane 120 (shown collapsed in FIG. 6) displays outputs. Pane 120, when expanded, would display a list of the configured output streams which is formatted in a similar manner to the visible inputs pane 110.

Figure 7:
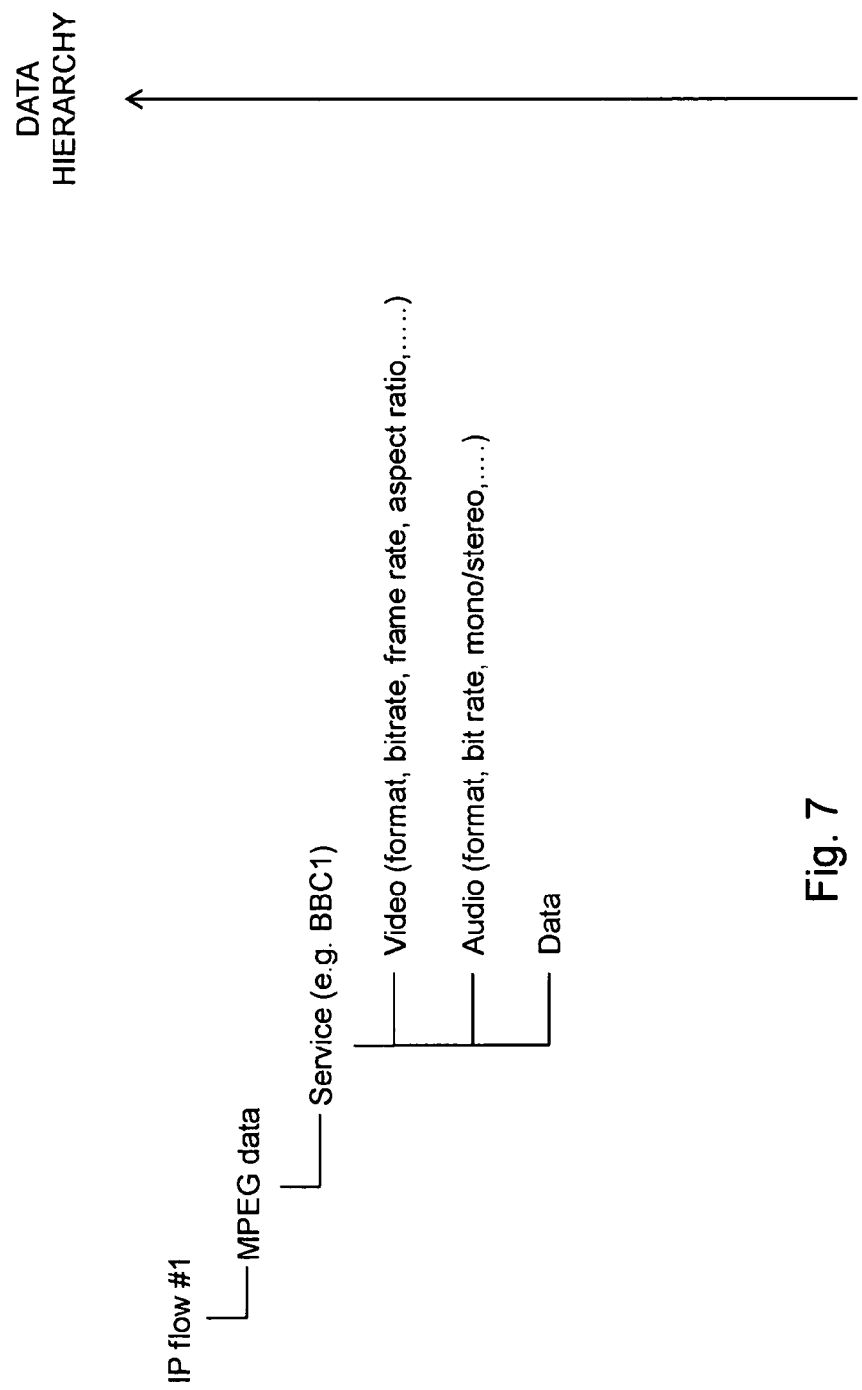
FIG. 7 shows a hierarchy of data flows and media content.
Figure 8:
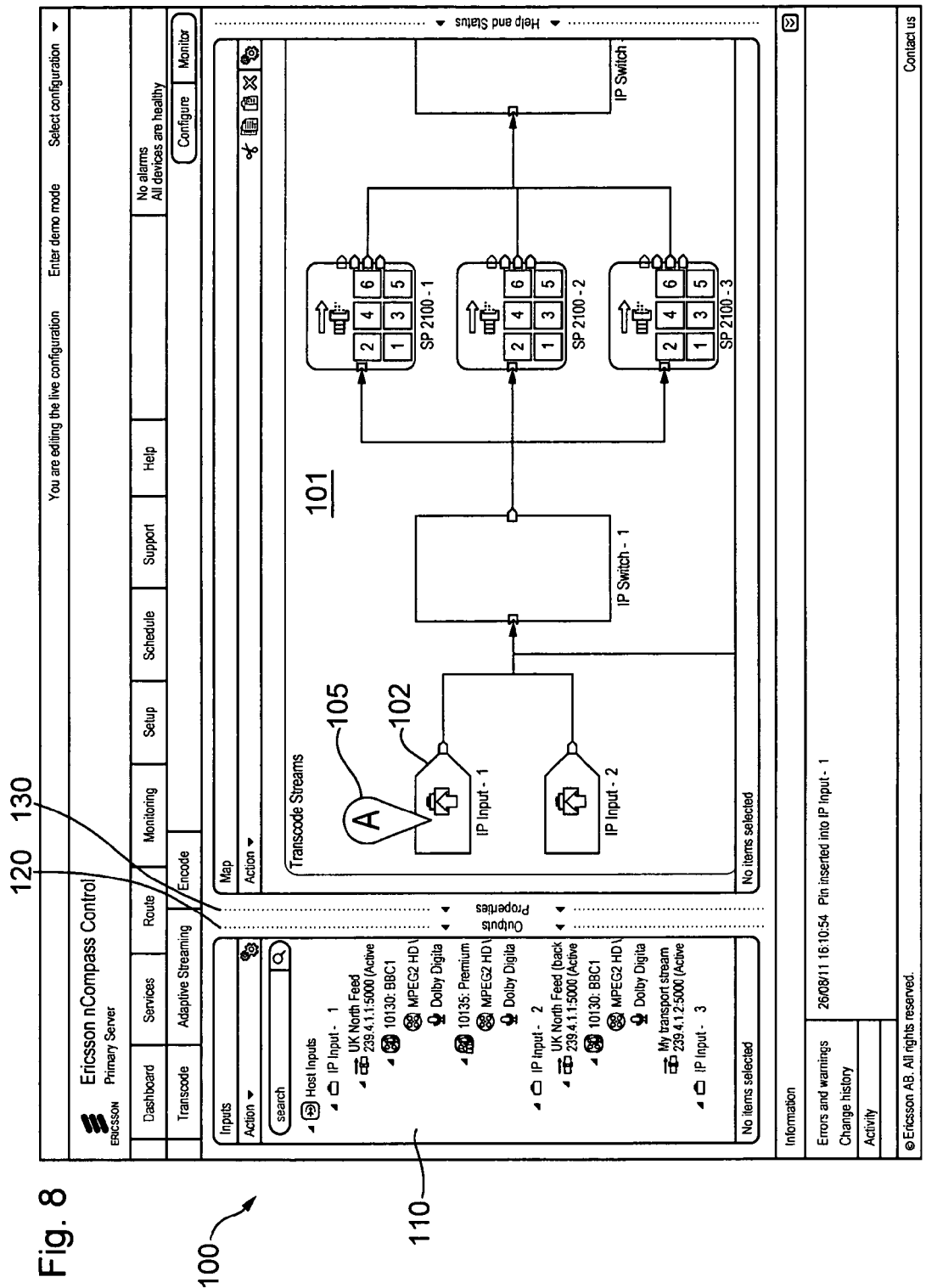
FIGS. 8 to 12 show example screenshots of a display of a user interface for controlling a media content distribution system, for a process of creating a route between two nodes of the system.
Figure 9:
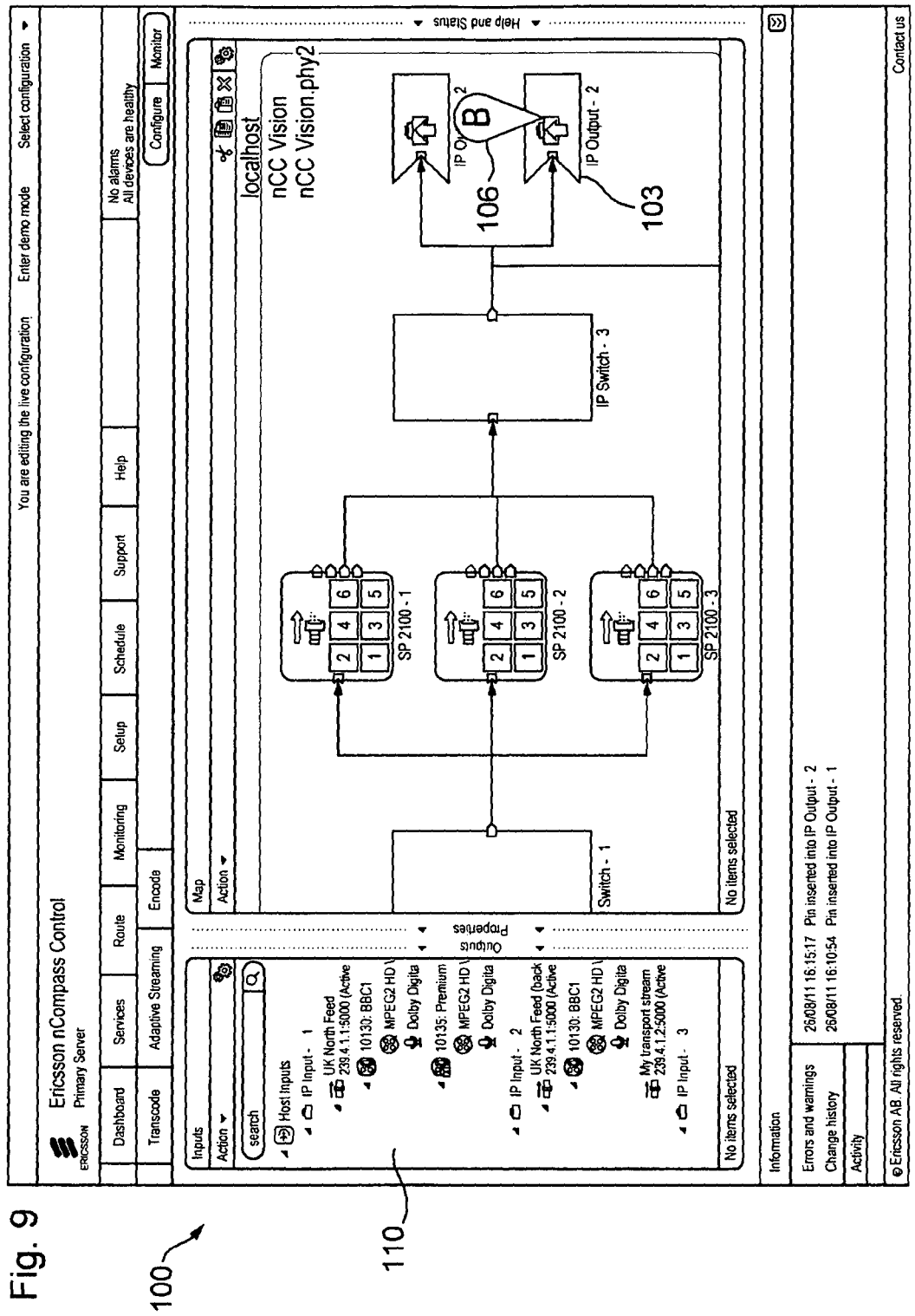

Pane 110 displays information about data flows when a user selects a position on the system map 101. The control system knows the flow of media between all nodes controlled by that control system. The GUI is only an abstraction of this low level view. Since the control system configured the connections between nodes, it has all the information needed to find what media content is present at a given node. The information about data flows is presented in hierarchical (tree-like) form. FIG. 7 shows an example of a data flow hierarchy. At the highest level are Internet Protocol (IP) data flows. Within each IP data flow are payloads carrying MPEG packets. Within MPEG packets are packets carrying data for particular content services. The components of a service are: video; audio and data. FIG. 7 is shown as an example of a data hierarchy. The hierarchy may have a different form to the one shown here, depending on what protocols are used to carry data and what media content types are carried.

An example of creating a new content processing/distribution stream will now be described with reference to FIGS. 8 to 12. Starting at FIG. 8, a user can select a first position on map 101. The user has zoomed into the map and placed a marker (waypoint) on an input. This marker is shown as "A", 105. Pane 110 displays a list of data flows (content services) for that point in the network, which will include any media content streams carried within the data flows. The user can select any desired position on map 101 and pane 110 will dynamically update to display the data flows at that position. Next, at FIG. 9, the user can select a second position on map 101. This is shown as "B", 106. Pane 120 displays a list of data flows (content services) for that point in the network, which will include any media content streams carried within the data flows. The user can select any desired position on map 101 and pane 110 will dynamically update to display the data flows at that position.

Figure 10:
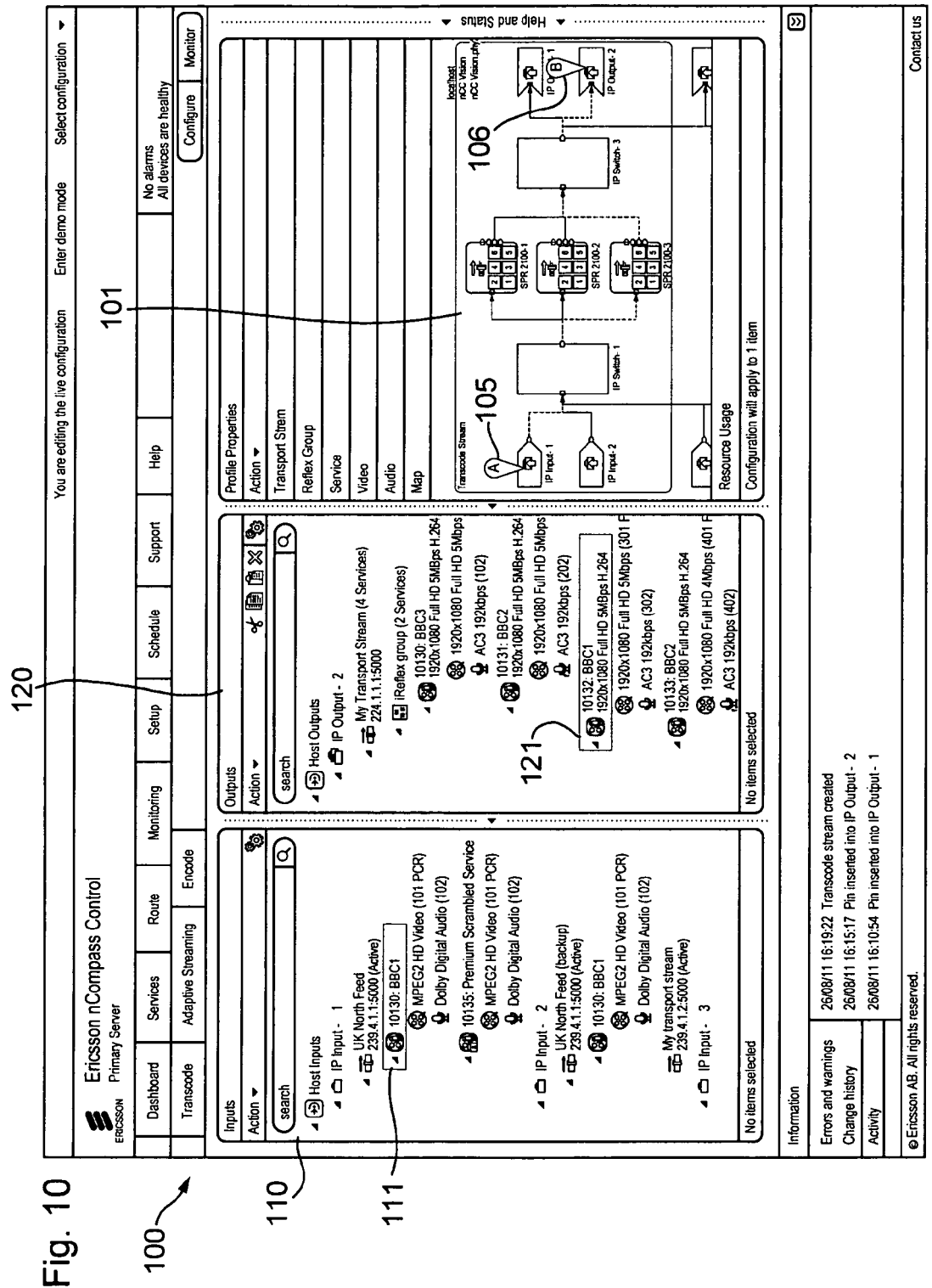

Positions "A" and "B" will be called waypoints as they define the route that the user requires. Referring to FIG. 10, next the user can select one of the media content streams 111 displayed within pane 110 and transfer this stream to a position 121 within the output pane 120. The selection and transfer can be performed via a drag and drop operation. The position 121 within the data flow hierarchy of the output pane 120 defines where the media content will be output. Initially, the content will inherit any default settings associated with that position in the system. For example, video format, bit rate, etc. The user can change any of the default settings. Next, the control system computes a route between the two waypoints A, B. The method by which the route is selected is described in more detail below under the heading "virtual resource routing". The route selected by the control system ensures that the media content stream passes via processing resources of the system which will apply the transforms required to transform the media content from the settings present at the input 102 to the settings required at the output 103. For example, if the media content stream 111 at the input is in High Definition (HD) and conforms with a European broadcasting format, and the output is required in Standard Definition (SD) and conforms with a US broadcasting format, the media content stream is routed via processing resources which will perform conversion between HD and SD and between EP and US formats. Other examples where processing operations may be required include processing of media content to convert media content into a form which is compatible with requirements of different end user devices (e.g. portable devices will typically require a lower bitrate stream compared to a set-top box).

Figure 11:
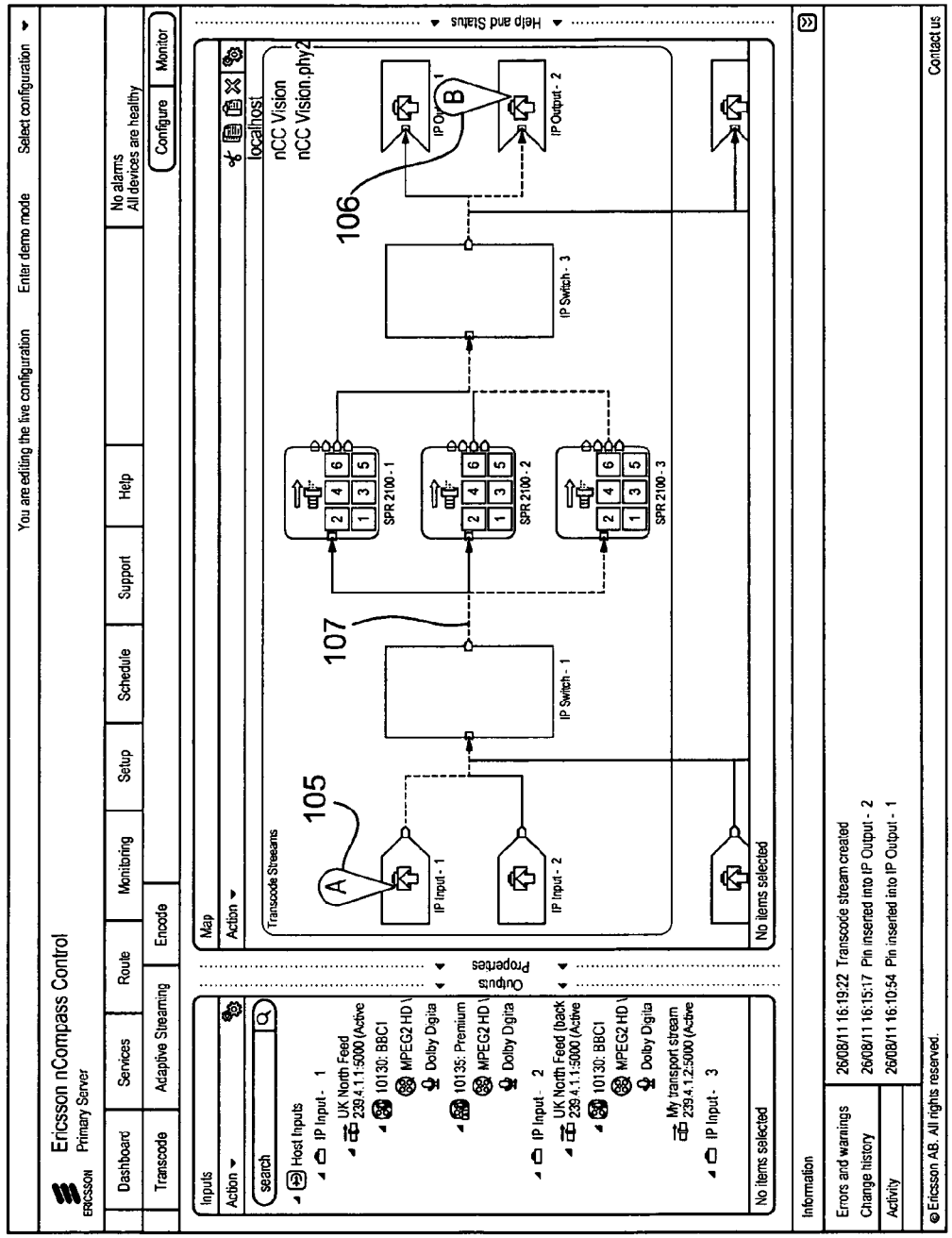

A route computed by the control system is displayed 107 to the user in FIG. 11. If a device cannot route a stream, the control system selects another device that has equivalent capability as associated valid connectivity. The control system selects the resources required to implement a required processing operation (or combination of operations), and combines the resources in the correct order.

Figure 12:
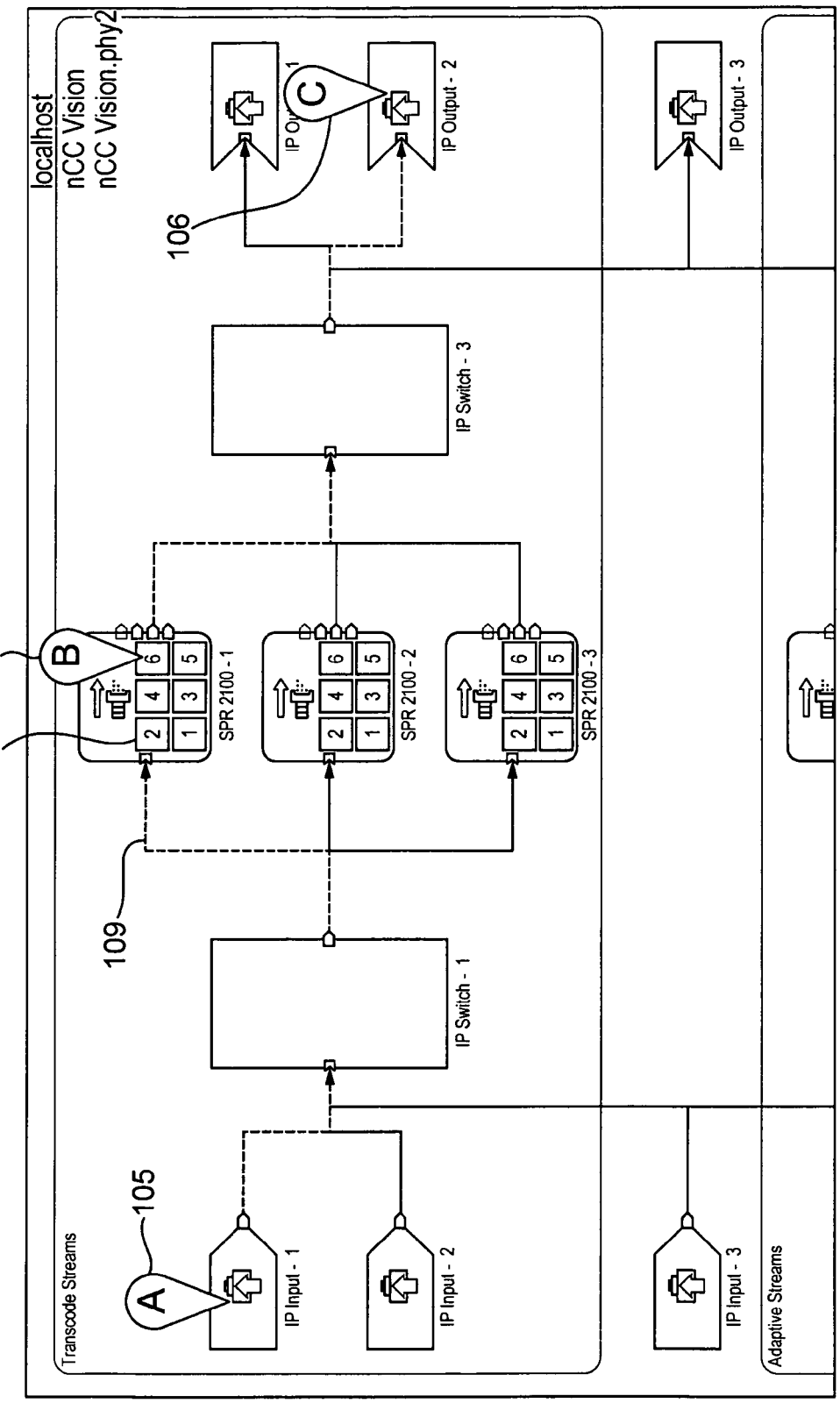

A user can select other points on the map via which the media content stream should (ideally) be routed. In FIG. 12, a user has selected a position 108. The control system determines if a route via that resource is possible. If the suggested routing is not possible, the control system can suggest another route through the system which is possible. Once routed, the user can drag and drop the stream route 108 to any alternative path on the map they choose. The set of boxes 112 represent option cards within a chassis. For example, a chassis may contain six option cards arranged in two rows of three cards, so this box shows the arrangement of cards that an operator would see if they look at a chassis in an equipment rack.

Figure 13:
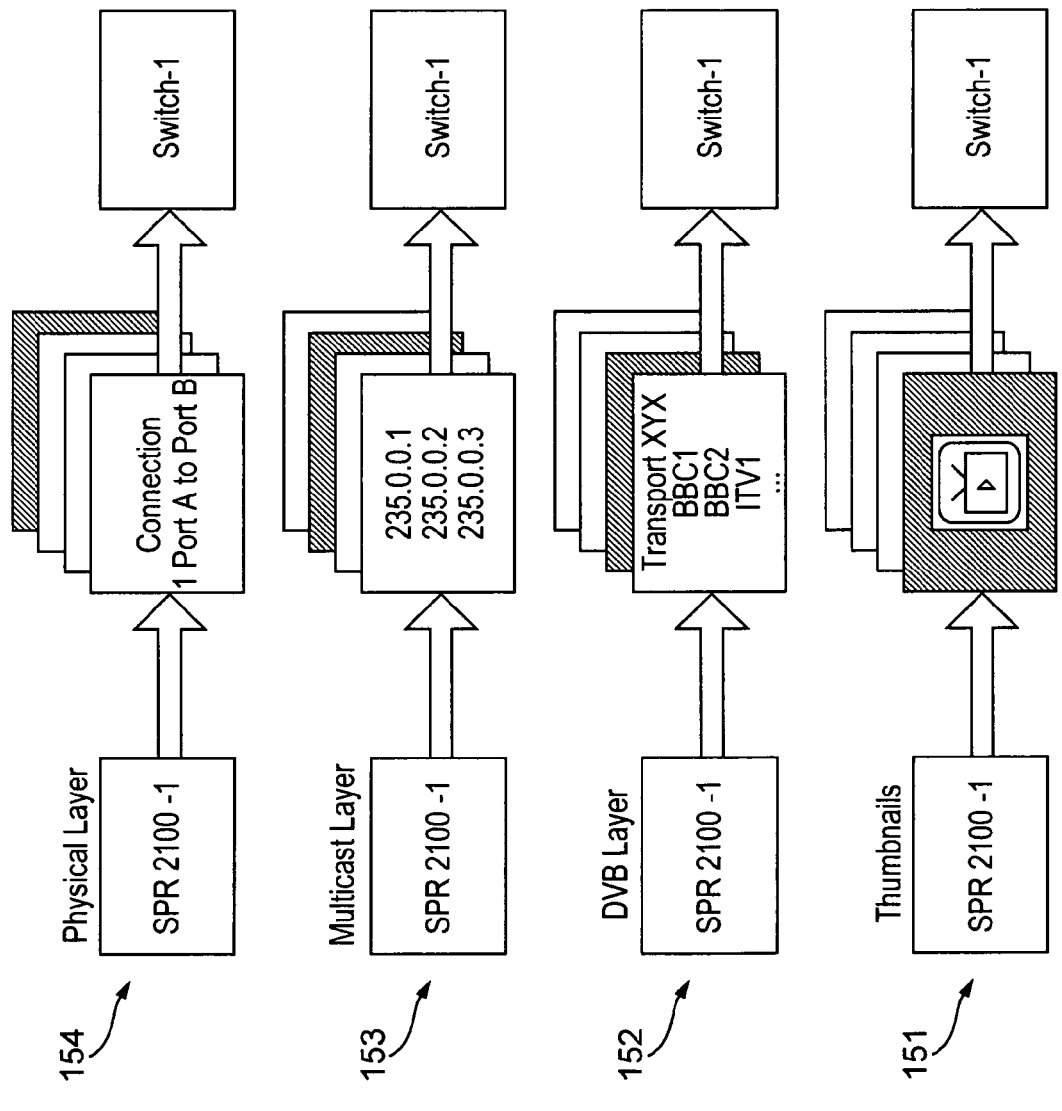
FIG. 13 shows layers of the display of the user interface.

As shown earlier in FIG. 7, IP data flows can carry many logical traffic flows. The control system can allow the user to navigate, inspect and edit each logical flow. This can be performed, for example, by a right click mouse action when a user has selected a path. FIG. 13 illustrates how, within the GUI, stream information could be viewed by several different types of user, with the information being displayed being tailored to their needs. On selecting a given stream of data, the various views could be cycled through:

View 151. This gives a simple screen capture of the various TV services within the data stream. It might be useful for a service engineer checking that the services are still outputting correctly.

View 152. This gives a textual listing of the individual components that make up each TV service. It might be useful for a service engineer or an installation engineer checking that all the data associated with a TV service is included in the output data stream.

View 153. This gives information relating to where the TV service data is being transmitted to. It might be useful to a system engineer checking that data is being transmitted correctly around a whole system.

View 154. This gives information on the physical connection being used to input and output the data. It might be useful to an engineer working in a data centre who is responsible for connecting the boxes of a system together.

Thus, it is possible to 'inspect' the IP stream. User can hit properties at any point through this stream and using that context, view properties, alarms etc.

Virtual Resource Routing

Figure 14:
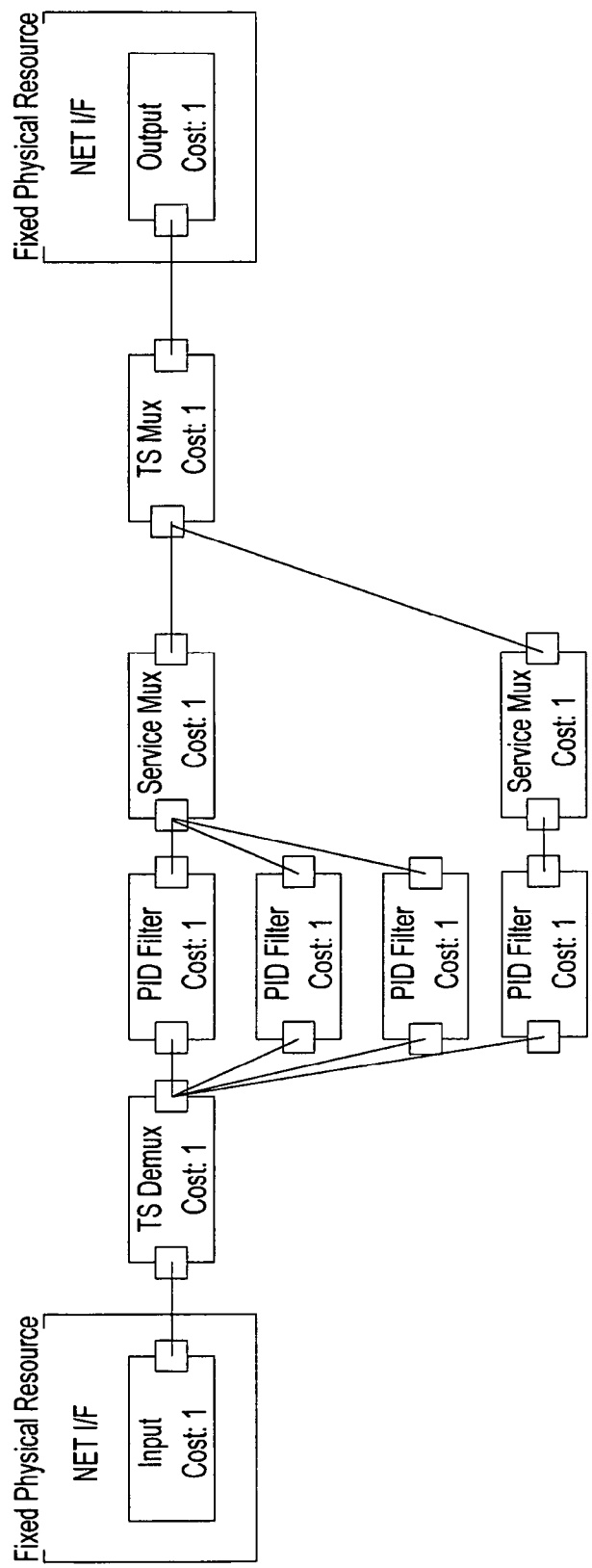
FIGS. 14 to 20 show features of virtual resource routing, and mapping virtual resources to actual physical resources in the system

The control system and user interface described above deal with system components as virtual resources. These virtual resources can be connected together into chains to perform a require set of operations. For example, FIG. 14 shows a multiplexer can be defined as:

1. An input.
2. Feeding a transport stream demux.
3. PID filters are then used to extract the required services from the demultiplexed transport stream.
4. The services are then multiplexed together into single program transport streams.
5. The single program transport streams are then multiplexed together to form an output transport stream.
6. Feeding an output.

Each of these stages can be modelled as a set of virtual resources. For example, FIG. 14 shows a set of PID filter resources and multiple service mux resources. This is very useful for partitioning the system, but a mechanism is required for mapping the virtual resources onto actual physical components. This is the action that the routing algorithm is intended to perform. The routing algorithm will be supplied with a connected set of virtual resources or stream definition. It calculates the most efficient way to map the virtual resources and connections to physical resources.

The routing algorithm takes into account the fact that there might be several different physical resources available that can be used to implement the required actions. As equipment cards are inserted or removed from the system this list of physical resources will change and the routing may have to be recalculated. Therefore, it is advantageous that the routing algorithm is: fast; makes efficient use of the available resources; is flexible enough to cope with changing resources; is capable of producing repeatable results; and is able to cope with imposed constraints (i.e. be forced to use specific physical resources). Each of the routing algorithm requirements will now be described in more detail.

Fast.

In order to produce fast routing solutions, dead-end higher cost solutions should be eliminated as soon as possible. Solution pruning must therefore be employed in whatever routing mechanism is implemented.

Efficient. To make the best use of the available resources it is a good idea to fill each one to capacity. This is best achieved by routing using the most constrained components first. This can be calculated using the routing cost and routing range to steer solution selection.

Flexible. The routing algorithm should have no knowledge of overall system topology or the cards that are present in the chassis. All physical resource information is held in the XPO3 database. When the algorithm is initialised the database is interrogated for a list of the currently available physical resources for each of the virtual resources that need to be routed.

Repeatable. All the mechanisms used to determine which components are to be connected together and in which order must be deterministic. The order in which the resources are delivered to the routing algorithm by the XPO3 database should not affect the output solution.

Constraints. In order to allow specific physical resources to be used (such as fixed input and output pins for transport streams) it must be possible to specify an input mapping between a physical and a virtual resource on the input to the routing algorithm.

Some routing basics will now be described.

Routing Range.

Figure 15:
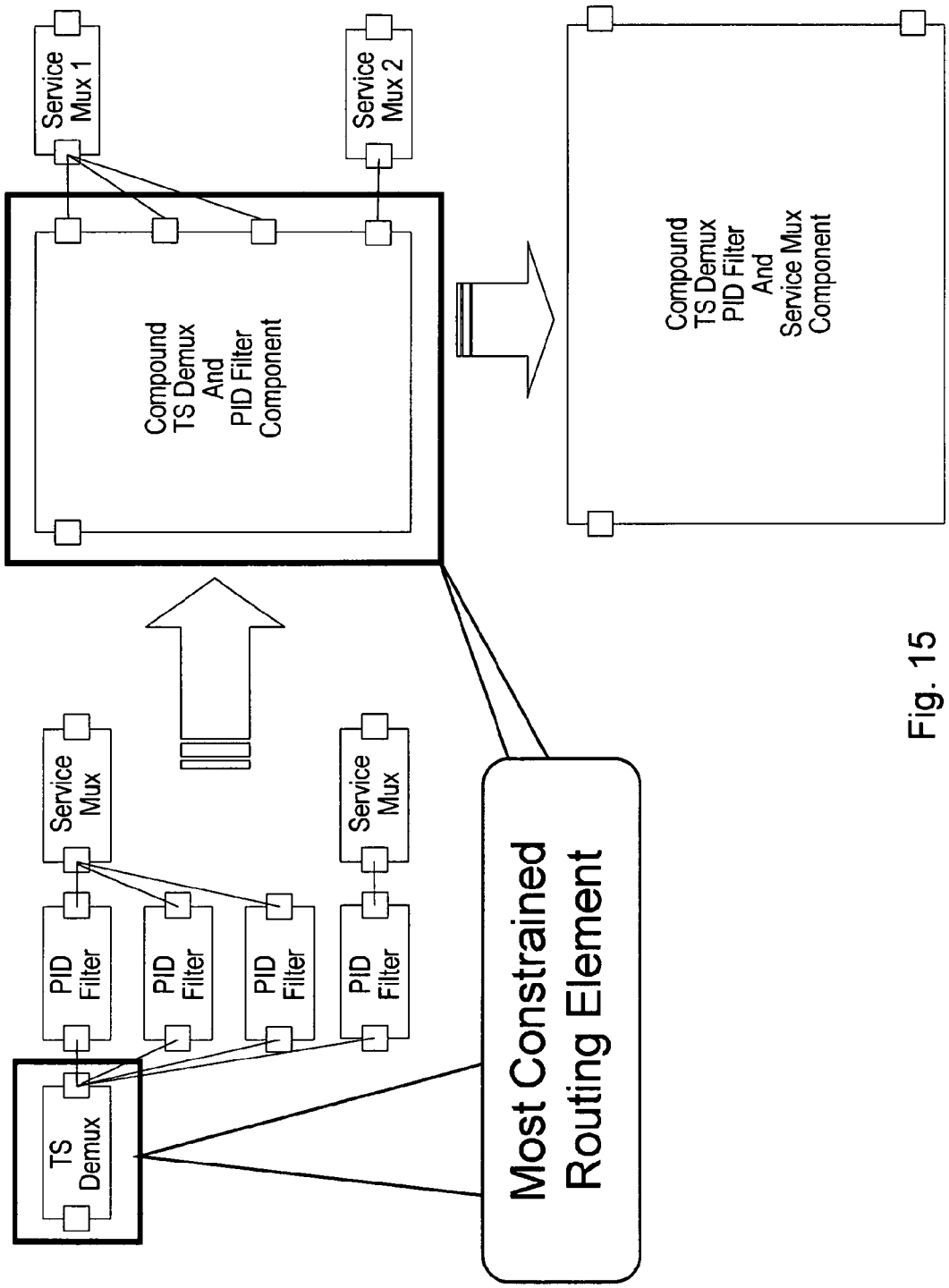

Each virtual resource has a set of pins associated with it to enable data to be input and output. The nature of the physical resources that these virtual resources are part of determines where the data can be routed from and to. Virtual resources that are totally internal to a physical resource may only be able to transfer data within that physical resource. Virtual resources that are located on option card may only be able to transfer data between other resources on the same option card. Other virtual resources may be able to transfer data to any other virtual resource. This constraint is known as the routing range. This routing range should be adhered to, and can be one of the most important constraints present in the system. Crossing these routing boundaries implies significant routing connections (between physical components or actual option cards) and care must be taken to ensure that they are minimised. Therefore it is proposed that the routing algorithm works hierarchically, routing the most constrained components together first, building new 'compound' virtual resources that can then be routed together. This is illustrated in FIG. 15.

Routing Congestion.

Figure 16:
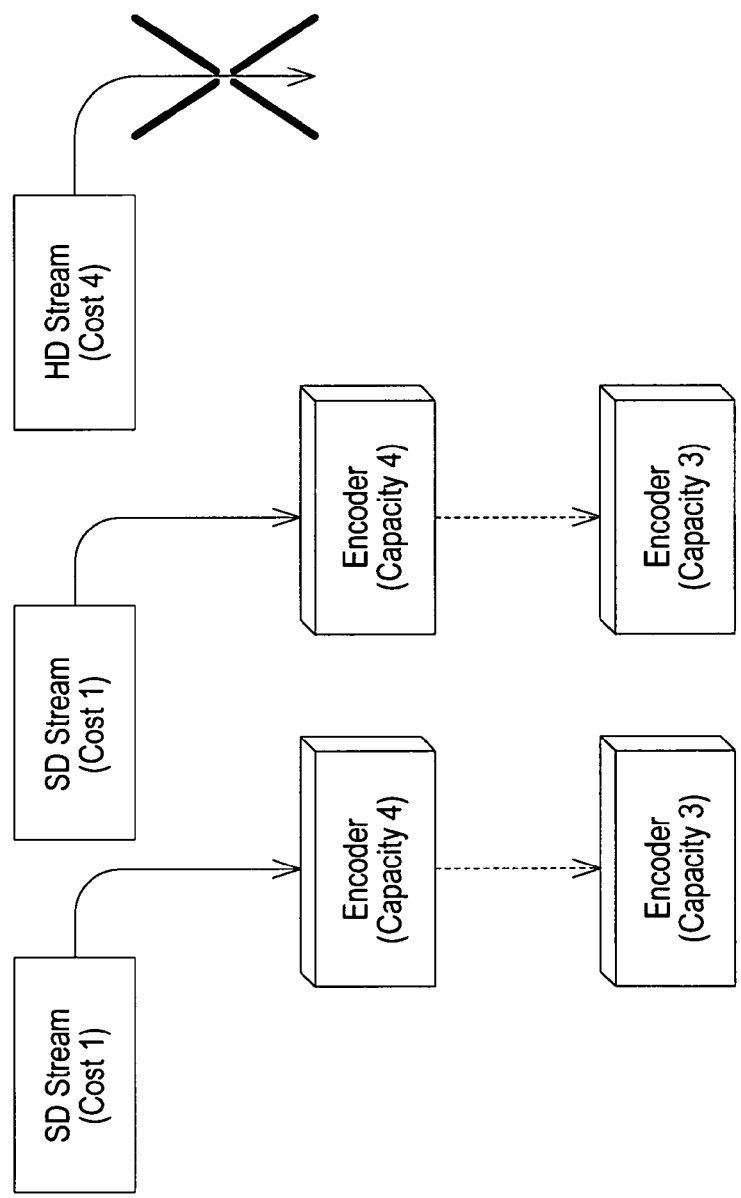
Figure 17:
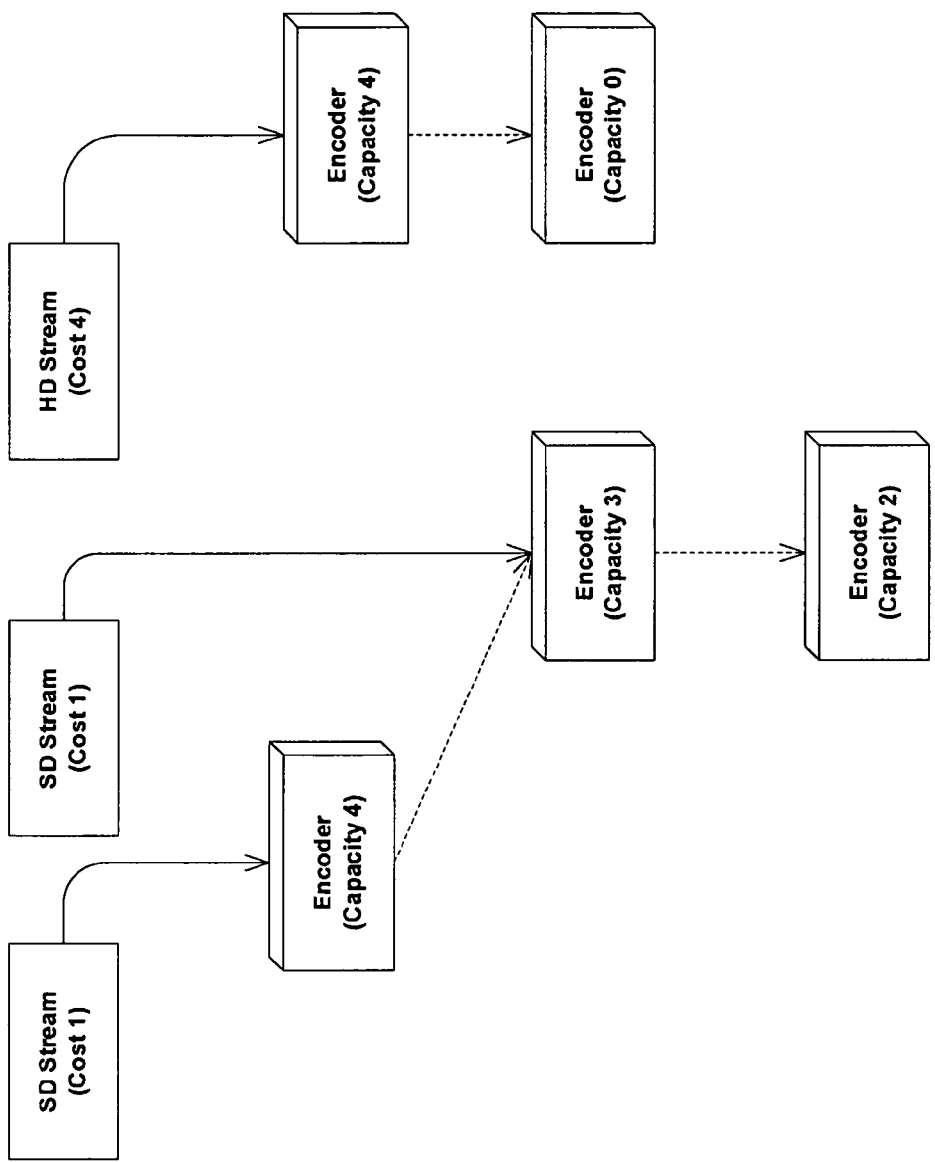

When allocating the physical resources, it is tempting to try to 'spread the load' over as many identical physical resources as possible. However, this can lead to problems when additional routes need to be implemented. Take for instance the example of a video encoder component. Consider an example case where the video encoder is capable of encoding multiple SD resolution streams or a single HD resolution stream. If the routing algorithm tries to 'spread the load', allocating each stream to a new physical resource, then depending on the order that the streams are set up the routing algorithm could fail to route the HD stream. This is illustrated in FIG. 16. However, if the algorithm always tried to fill a physical resource to capacity before trying to use the next available physical resource, then the results will be deterministic and there is a much greater chance of the routing succeeding, as shown in FIG. 17. Therefore, it is proposed to include a mechanism for determining the routing congestion within the routing algorithm. The routing algorithm can be arranged to favour more congested routes, leading to a better overall utilisation of the available physical resources.

The routing algorithm will now be analysed in more detail.

Input.

The input to the routing algorithm will be a stream definition identifying a list of virtual resources. Each virtual resource will contain a list of input and output virtual pins, and a (possibly) blank reference to a physical resource. The stream definition will also define the connectivity between the various input and output pins on the virtual resources. The routing algorithm will be used to determine the physical resources and pins which will be used to implement the stream definition. The input virtual resources could already have physical resources allocated to them. This will be used to restrict/steer the routing solution.

Initialisation.

Figure 18:
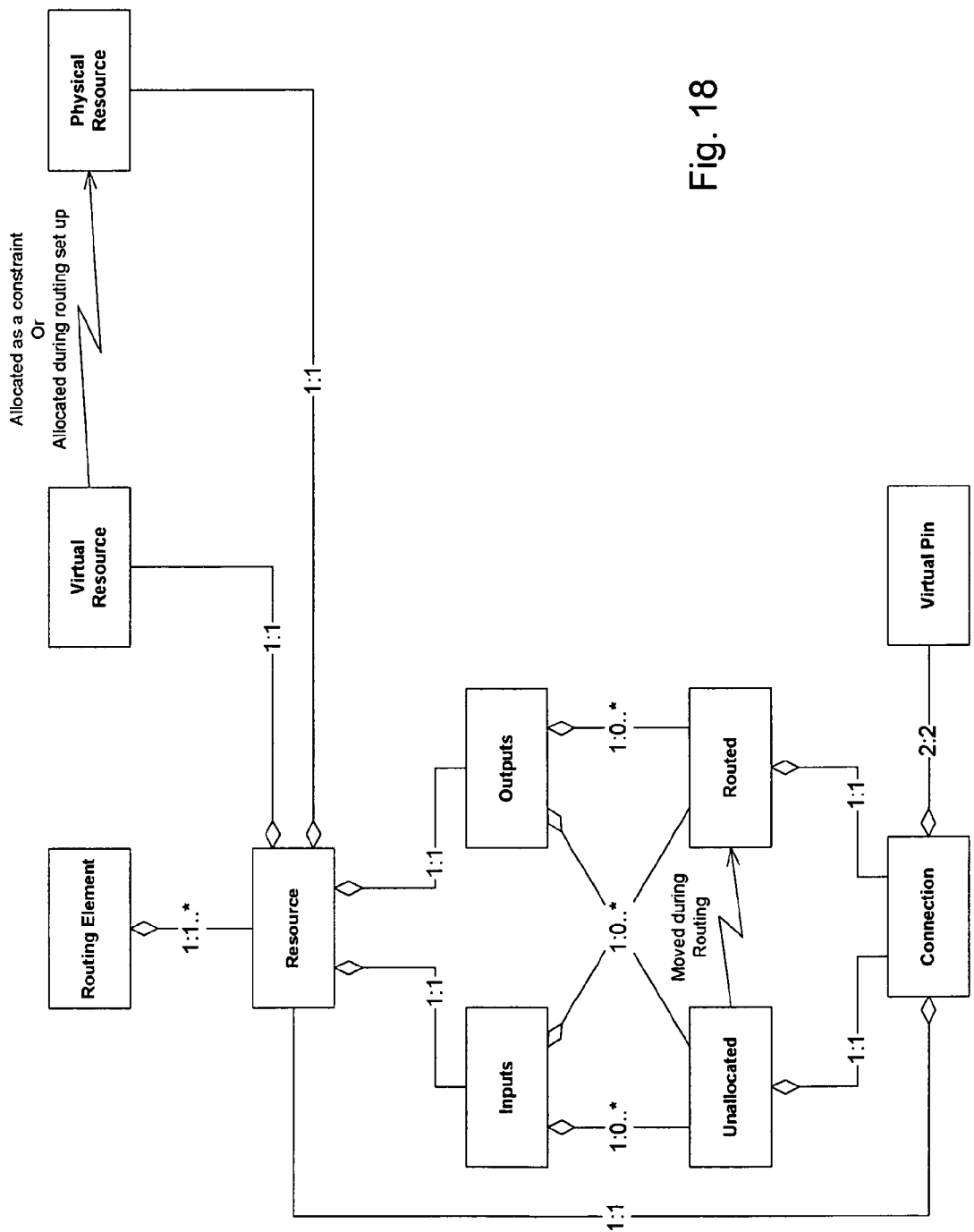

On initialisation the input stream definition will be traversed. For each virtual resource in the stream definition a list of corresponding physical resources will be requested from the XPO3 database. In the case of a virtual resource that already has a physical resource associated with it, the allocated physical resource will be used in preference to the list returned by the database. A routing element will be created for each of the physical resources. The routing element will be populated with the list of input and output connections. The routing element will then be inserted (in a sorted manner) into an overall list of routing elements. The sorting mechanism will be based firstly on the routing range of its output pins (most constrained first) and then by the number of the most constrained pins (highest first), and then by its position within the stream (earliest first). The routing algorithm will be based around the manipulation of routing elements. This is illustrated in FIG. 18.

Routing Step.

Once the list of routing elements has been initialised, the routing itself can be started. As the list is a sorted list, all the routing operations will take place on the first element in the list. Routing for the element comprises:

For each of the lowest routing range, unallocated output pins generate a list of connected routing elements.

If the list is empty, then the routing has failed.

Using the associated physical resource information, select the most constrained, connected routing element.

Update the associated physical resource's constraint information with the cost of routing the connected virtual resource.

Move the output connection to the list of routed connections, and move the corresponding input connection to the list of routed connections.

Add the connected routing element to a temporary list of connected routing elements.

Move onto the next output connection.

Once all the output connections have been routed add the temporary list of routing elements to the current routing element to form a new compound routing element. Now prune all the unused, connected routing elements from the overall list of routing elements.

Check the current routing element for any unallocated input or output pins that now reference the current routing element as their parent routing element. If any are found then move them to the routed list (circular internal connections).

In order to maintain the sorted nature of the routing element list, the current element should be removed from the overall routing element list and re-inserted using the same criteria that were used in the initialisation phase.

If an element cannot be routed (due to lack of capacity) this it is deleted and the list of routing element is pruned to remove any other elements which were dependent on it.

The routing step can now be repeated.

Completion.

Routing is complete at the point when there is only one routing element left in the overall routing element list. At this point the initial stream definition can be updated with the physical resource information as determined during the routing.

Figure 19:
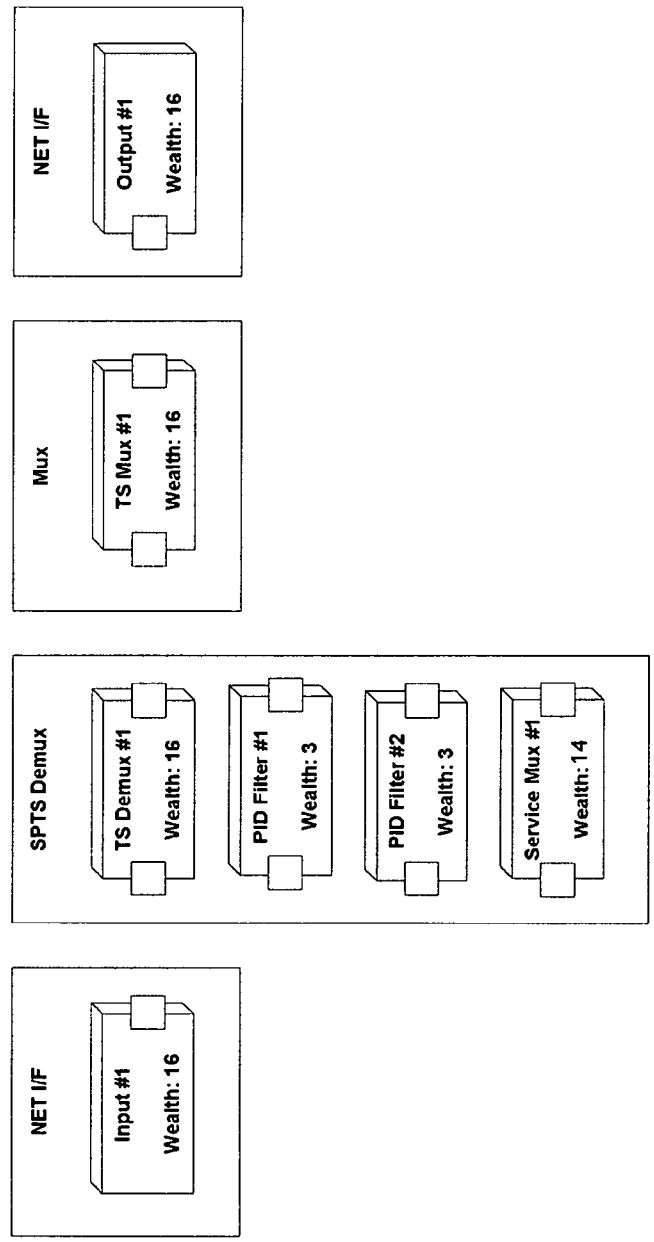
Figure 20:
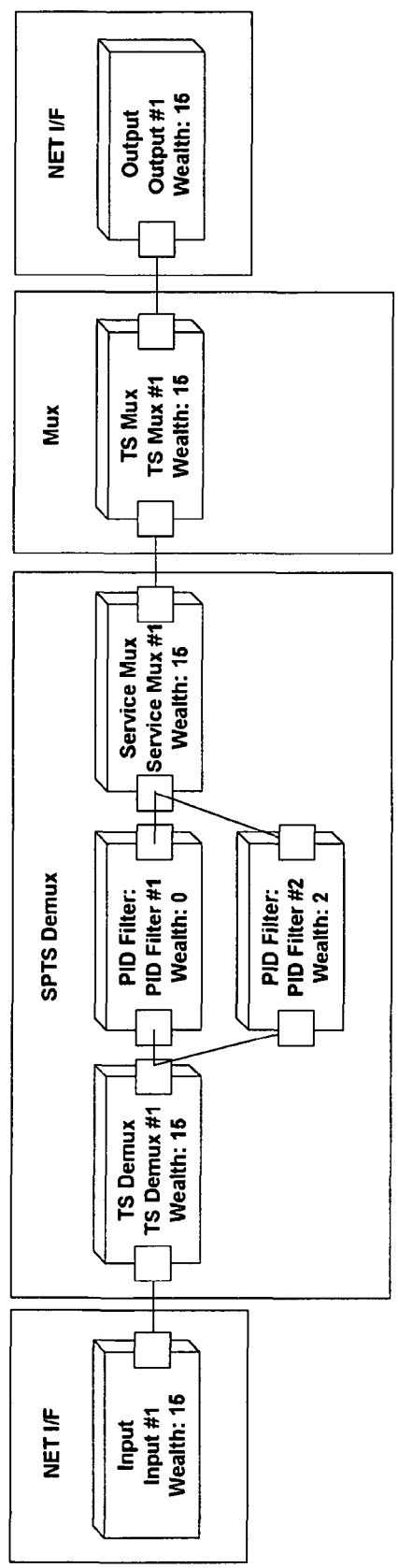

FIG. 19 represents the physical resources prior to being routed. This shows the initial wealth of each of the resources, the routing range of connections that can be made to and from them (the colour of the connection points—green for local, pink for external) and the fact that there are no connections have been created between the resources yet. FIG. 20 represent the physical resources after the routing has been performed. The connections between the resources are now shown and the remaining wealth has been reduced appropriately. The names of the virtual resource that have been allocated are also marked on the diagram. FIGS. 19 and 20 relate to the example shown earlier in FIG. 14, which shows the required virtual resource connectivity and the cost of each resource.

It should be noted that the remaining wealth of the Service Mux component is actually wrong—given that 2 virtual resource of cost 1 each have been allocated the remaining wealth should be 14.

The computing of a route across a system can take account of Quality of Service (QoS) considerations. The routing of a service configuration across a network of devices using virtual resources depends upon the metrics of quality that are of importance to that service. For example, in a 1+1 redundancy system, a control system can route across the primary device's capabilities. However, the 1+1 system may be in a state of failure, where the secondary device is active, but it can still has capabilities and can be routed within a stream. It is therefore not possible to factor in the state of the system when determining the most suitable route to take without other data available to the routing algorithm.

An aspect of the route computation is to maintain services in operation at the required level of quality. When routing a virtual resource to a device, it is possible to identify the quality of service the device can provide for a potential virtual resource instance. With this knowledge, it is possible to prioritise routes based on the quality of service requirements. If any the devices supporting the service no longer meets the QoS requirements, it can report this to the control system to decide whether to re-route the service.

Some examples will now be described.

Case 1: A new service is being routed. It is a high priority service and will want redundancy available at any time. The routing algorithm would avoid routes that have a single point of failure where possible, even if it is only temporary. If the device fails after the service has been routed, it could be automatically scheduled for re-routing on the basis that the device no longer meets the redundancy QoS requirements.

Case 2: Two devices advertise the same capabilities, but one device has a redundancy switch time of 60 seconds, whereas the second device can achieve it in less than 10 seconds. It would be possible to have high priority services prefer the 10 second switch time QoS and low priority services route to the 60 second switch time QoS.

Case 3: Different devices can advertise a glitch QoS when applying new configuration items. Encoders that allow for reconfiguration of a virtual resource without glitches could be prioritized when configuration changes are going to be more frequent. Configuration changes that are identified as being only carried out in a service window can route to resources that don't offer a glitch-free QoS.

Case 4: Devices can advertise a 'reliability' QoS to indicate how many alarms or failures have occurred within a given time period. High priority services can avoid these devices by requiring a higher up-time QoS.

Figure 21:
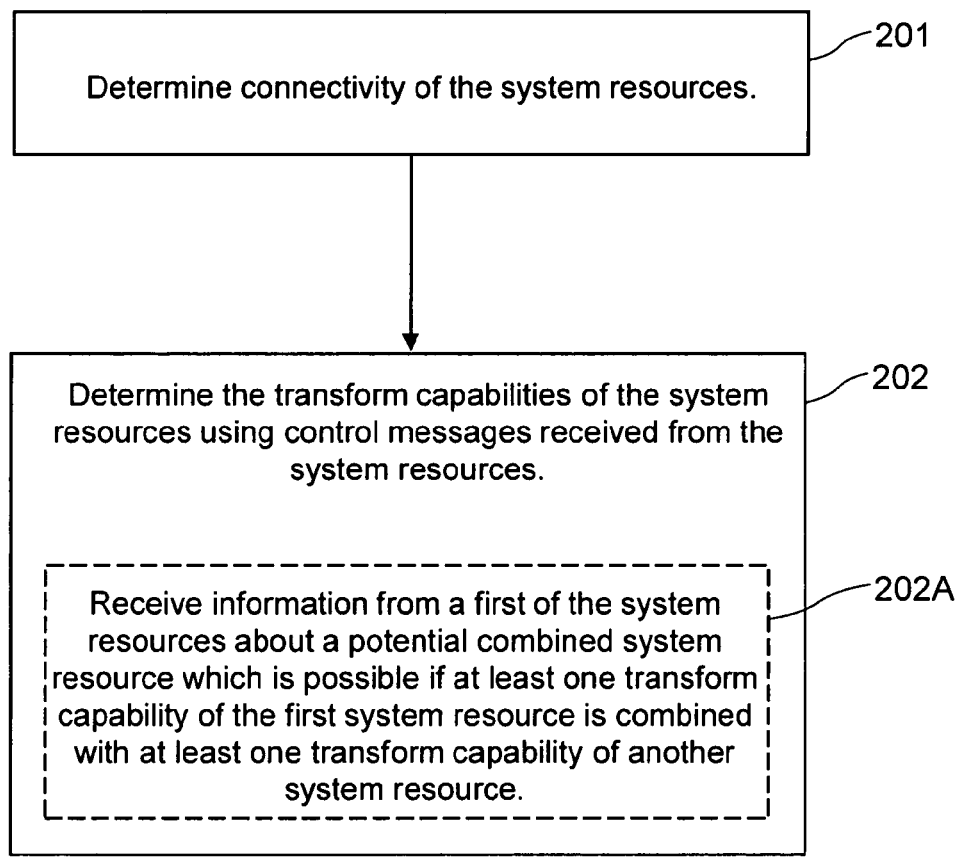
FIGS. 21 and 22 show methods performed by a system controller.
Figure 22:
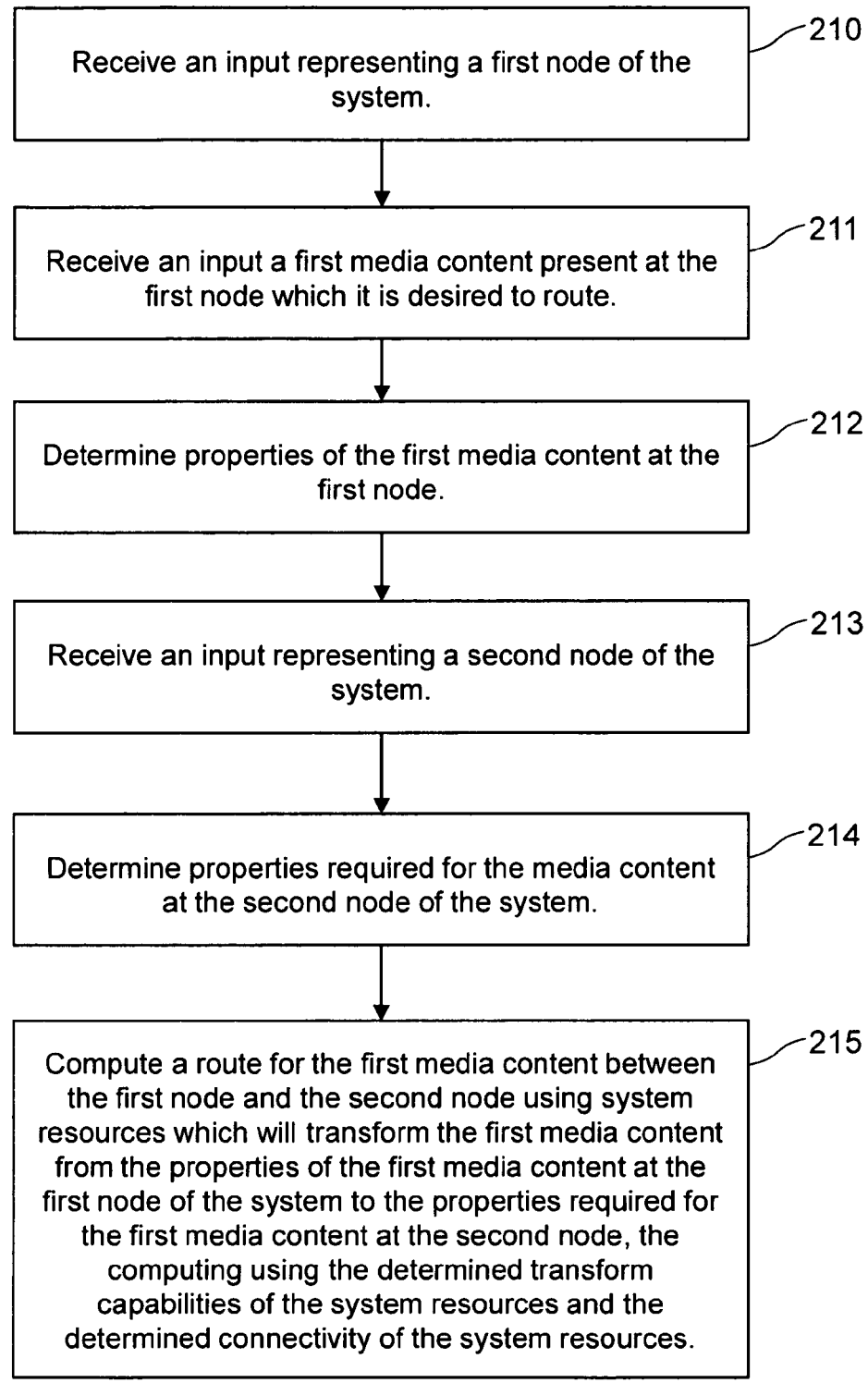

FIGS. 21 and 22 show methods performed by a system controller (e.g. 20, FIG. 1). At step 201, the controller determines connectivity of the system resources. At step 202 the controller determines the transform capabilities of the system resources using control messages received from the system resources. A further step 202A can comprise receiving information from a first of the system resources about a potential combined system resource which is possible if at least one transform capability of the first system resource is combined with at least one transform capability of another system resource.

Referring to FIG. 22, at step 210 the controller receives an input representing a first node of the system and at step 211 receives an input a first media content present at the first node which it is desired to route. At step 212 the controller determines properties of the first media content at the first node. At step 213 the controller receives an input representing a second node of the system and at step 214 the controller determines properties required for the media content at the second node of the system. At step 215 the controller computes a route for the first media content between the first node and the second node using system resources which will transform the first media content from the properties of the first media content at the first node of the system to the properties required for the first media content at the second node, the computing using the determined transform capabilities of the system resources and the determined connectivity of the system resources. Step 215 can also use the "recipe data" described above, which is knowledge of how to link resources to produce a required transform on media content.

Figure 23:
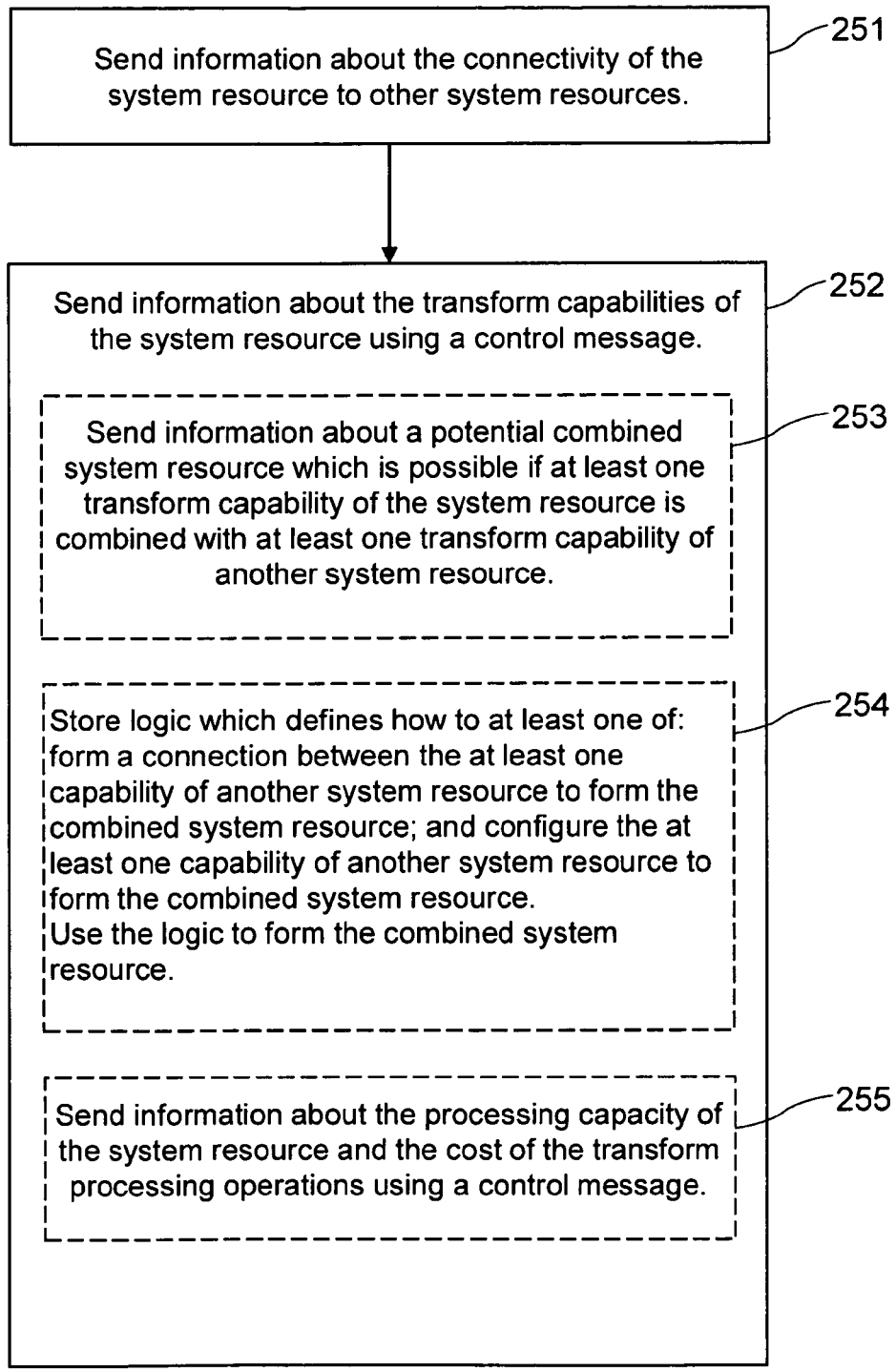
FIG. 23 shows a method performed by a system resource.

FIG. 23 shows a method performed by a controller at a system resource (e.g. 200, FIG. 3). At step 251, the controller sends information about the connectivity of the system resource to other system resources. At step 252, the controller sends information about the transform capabilities of the system resource using a control message. Optionally, at step 253, the controller can send information about a potential combined system resource which is possible if at least one transform capability of the system resource is combined with at least one transform capability of another system resource. At step 254, the controller can store logic which defines how to at least one of: form a connection between the at least one capability of another system resource to form the combined system resource; and configure the at least one capability of another system resource to form the combined system resource. The controller can use the logic to form the combined system resource. At step 255, the controller can send information about the processing capacity of the system resource and the cost of the transform processing operations using a control message.

Figure 24:
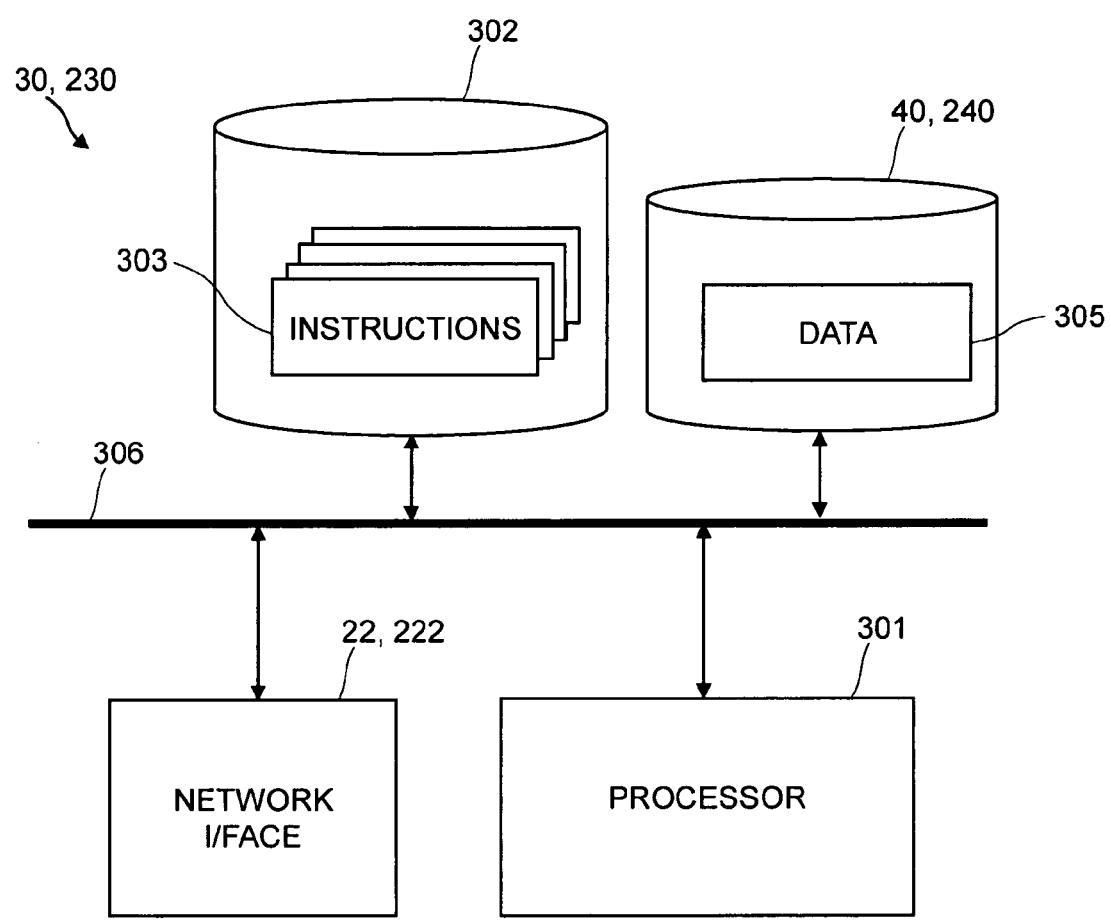
FIG. 24 shows processing apparatus for implementing the controllers of FIGS. 2 and 3.

For completeness, FIG. 24 shows processing apparatus which can be used to implement the controllers 20, 230 shown in FIGS. 2 and 3. The processing apparatus comprises one or more processors 301 which may be microprocessors, controllers or any other suitable type of processors for executing instructions to control the operation of the device. The processor 301 is connected to other components of the device via one or more buses 306. Processor-executable instructions 303 may be provided using any computer-readable media, such as memory 302. The processor-executable instructions 303 can comprise instructions for implementing the functionality of the described methods, such as the functional modules 31-34 of controller 30. The memory 302 is of any suitable type such as read-only memory (ROM), random access memory (RAM), a storage device of any type such as a magnetic or optical storage device. Additional memory 40, 240 can be provided to store data 305 used by the processor 301, such as the data 41-43 shown in FIG. 2 and the data 241-245 shown in FIG. 3. The processing apparatus comprises one or more network interfaces 22,222 for interfacing with other network entities, such as other nodes of the system.

Although the embodiments described above have used flows of video and audio content as examples of media content, it is also possible to apply the ideas to items of media content such as: images (capabilities can be different types of image processing functions); documents (capabilities can be different types of document processing functions).

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operating a controller of a media content distribution system, the system comprising a plurality of interconnected system resources arranged to receive and/or transmit media content, a number of the system resources having a capability of performing a transform processing operation on the media content, the method comprising:
   automatically determining connectivity of the system resources; and
   determining the transform capabilities of the system resources using control messages received from the system resources, wherein
   determining the transform capabilities of the system resources comprises receiving information from a first of the plurality of system resources about a potential combined system resource which is possible if at least one transform capability of the first system resource is combined with at least one transform capability of another system resource.

2. The method according to claim 1, wherein the information received from the first of the system resources specifies the at least one transform capability of another system resource which is required to perform the potential combined system resource.

3. The method according to claim 1, wherein the potential combined resource comprises a transcoder capability which combines a decode capability at one system resource with an encode capability at another system resource.

4. The method according to claim 1, wherein the potential combined system resource combines capabilities of resources which are geographically separated.

5. The method according to claim 1, wherein the system resource is a video processing resource and the step of determining the transform capabilities of the system resources comprises receiving a control message carrying information about at least one of: supported video coding/decoding formats; supported transcoding parameters; supported bit rates; supported aspect ratios; supported audio coding formats.

6. The method according to claim 1, wherein each of the system resources comprise processing resources which have a processing capacity, and each of the transform processing operations requires an amount of the processing resources to implement, called a cost, and the method further comprises determining processing capacity of the system resources and cost of the transform processing operations using control messages received from the system resources.

7. The method according to claim 1, further comprising:
   receiving an input representing a first node of the system;
   receiving an input representing a first media content present at the first node which it is desired to route;
   determining properties of the first media content at the first node;
   receiving an input representing a second node of the system;
   determining properties required for the media content at the second node of the system;
   computing a route for the first media content between the first node and the second node using system resources which will transform the first media content from the properties of the first media content at the first node of the system to the properties required for the first media content at the second node, the computing using the determined transform capabilities of the system resources and the determined connectivity of the system resources.

8. The method according to claim 7, wherein the step of computing a route comprises determining a route based on at least one of: an amount of resources required, an amount of resources remaining, quality of service, congestion.

9. The method according to claim 7, wherein the controller comprises a user interface and the method further comprises:
   outputting a map of the system resources on the user interface; and
   receiving the input representing a first node of the system and receiving the input representing a second node of the system in response to inputs via the user interface of selected elements on the map.

10. The method according to claim 9, further comprising:
    outputting, in response to the input via the user interface of a selected element on the map, display elements representing media content present at the node corresponding to the selected element;
    receiving an input via the user interface of the first media content as a selection of one of the display elements.

11. The method according to claim 1, further comprising:
    generating a logical map of the system resources, based on the determined connectivity of the network resources and the determined capabilities of the network resources;
    outputting the logical map as a display on a user interface, wherein the map comprises icons representing the system resources.

12. The method according to claim 11, wherein the connectivity and capability information is in a hierarchical form, and the method further comprises:
    receiving a user input via the user interface to explore a selected resource or portion of the logical map and, in response, outputting an increased amount of detail about the selected resource or portion of the map from a lower hierarchical level of the connectivity and capability information.

13. The method according to claim 11 further comprising: receiving an input via the user interface of a selected node on the map; and, outputting, via the user interface, information about media content present at that node.

14. The method according to claim 13, wherein the information about media content is presented as a hierarchy of data flows.

15. The method according to claim 11, further comprising:
receiving an input via the user interface of a first waypoint node on the map and outputting, via the user interface, information about a first set of media content present at that first waypoint node;
receiving an input via the user interface of a second waypoint node on the map and outputting, via the user interface, information about a second set of media content present at that second waypoint node;
determining properties required for the selected media content at the second waypoint node;
receiving an input via the user interface to transfer a selected media content stream from the first set to the second set; and
computing a route for the selected media content stream between the first waypoint node and the second waypoint node via network resources which transform the selected media content stream to the properties required at the second waypoint node.

16. The method according to claim 15, wherein the second waypoint node has a default set of properties associated with it and the step of determining properties required for the selected media content at the second waypoint node uses the default properties.

17. The method according to claim 15, wherein the input via the user interface to transfer a selected media content stream from the first set to the second set comprises a drag and drop operation between the first set and the second set.

18. The method according to claim 15, further comprising:
receiving an input via the user interface of a third waypoint node on the map; and
computing a route for the selected media content stream between the first waypoint node and the second waypoint node via the third waypoint node.

19. A computer program product comprising a non-transitory machine-readable medium carrying instructions which, when executed by a processor, cause the processor to perform the method of claim 1.

20. A method of operating a system resource of a media content distribution system, wherein the system resource is capable of interconnecting with other system resources, and the system resource is capable of performing a transform processing operation on the media content, the method comprising:
sending information about connectivity of the system resource to other system resources; and
sending information about transform capabilities of the system resource as a control message to a system controller, wherein
sending information from the system resource comprises sending information about a potential combined system resource which is possible if at least one transform capability of the system resource is combined with at least one transform capability of another system resource.

21. The method according to claim 20, wherein the information sent from the system resource specifies the at least one transform capability of another system resource which is required to perform the potential combined system resource.

22. The method according to claim 20, wherein the potential combined resource comprises a transcoder capability which combines a decode capability at one system resource with an encode capability at another system resource.

23. The method according to claim 20, wherein the potential combined system resource combines capabilities of resources which are geographically separated.

24. The method according to claim 20, further comprising:
storing logic which defines how to at least one of: form a connection between the at least one capability of another system resource to form the combined system resource; and configure the at least one capability of another system resource to form the combined system resource; and
using the logic to form the combined system resource.

25. The method according to claim 20, wherein the system resource comprises a processing resource which has a processing capacity, and each of the transform processing operations requires an amount of the processing resources to implement, called a cost, and the method further comprises sending information about the processing capacity of the system resource and the cost of the transform processing operations using a control message.

26. The method according to claim 20, wherein the system resource is a video processing resource and the step of determining the transform capabilities of the system resources comprises sending a control message carrying information about at least one of: supported video coding/decoding formats; supported transcoding parameters; supported bit rates; supported aspect ratios; supported audio coding formats.

27. The method according to claim 20, wherein the step of sending information about connectivity of the system resource comprises:
advertising an identity of the system resource to other system resources;
receiving identities of other system resources connected to the system resource;
and wherein the information about connectivity of the system resource comprises the identities of other system resources that were received.

28. A system for a media content distribution system, the system comprising:
a system controller; and
a plurality of interconnected system resources arranged to receive and/or transmit media content, a number of the system resources having a capability of performing a transform processing operation on the media content, wherein
the system controller is arranged to automatically determine the connectivity and the transform capabilities of the system resources using a control message received from the system resources, and wherein
the control message received from a first of the plurality of system resources comprises information about a potential combined system resource which is possible if at least one transform capability of the first system resource is combined with at least one transform capability of another system resource.

29. A system resource for a media content distribution system, wherein the system resource is capable of interconnecting with other system resources, and the system resource is capable of performing a transform processing operation on the media content, the system resource being arranged to:

send information about connectivity of the system resource to other system resources, and send information to a system controller about a potential combined system resource which is possible if at least one transform capability of the system resource is combined with at least one transform capability of another system resource.

30. A media content distribution system, comprising:

a plurality of interconnected system resources arranged to receive and/or transmit media content, a number of the system resources arranged to perform a transform processing operation on the media content;

a system controller arranged to automatically determine the connectivity and the transform capabilities of the system resources using a control message received from the system resources, wherein the control message received from a first of the plurality of system resources comprises information about a potential combined system resource which is possible if at least one transform capability of the first system resource is combined with at least one transform capability of another system resource.

31. A method of operating a media content distribution system comprising a plurality of interconnected system resources arranged to receive and/or transmit media content, a number of the system resources arranged to perform a transform processing operation on the media content and a system controller, the method comprising:

automatically determining the connectivity and the transform capabilities of the system resources by sending a control message from the system resources to the system controller, wherein the control message received from a first of the plurality of system resources comprises information about a potential combined system resource which is possible if at least one transform capability of the first system resource is combined with at least one transform capability of another system resource.

* * * * *